(12) United States Patent
Yoshida et al.

(10) Patent No.: US 9,077,625 B2
(45) Date of Patent: Jul. 7, 2015

(54) APPARATUS AND METHOD FOR CONTROLLING A TRANSMISSION INTERVAL OF MAINTENANCE PACKETS IN A COMMUNICATION NETWORK

(71) Applicant: FUJITSU LIMITED, Kawasaki-shi, Kanagawa (JP)

(72) Inventors: Eitatsu Yoshida, Fukuoka (JP); Yasushi Kurokawa, Fukuoka (JP); Yuichiro Katsura, Onga (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 13/849,065

(22) Filed: Mar. 22, 2013

(65) Prior Publication Data

US 2013/0315071 A1  Nov. 28, 2013

(30) Foreign Application Priority Data

May 23, 2012  (JP) ................................. 2012-118029

(51) Int. Cl.
*H04L 12/26* (2006.01)
(52) U.S. Cl.
CPC ........ *H04L 43/0817* (2013.01); *H04L 43/0811* (2013.01); *H04L 43/0882* (2013.01); *H04L 43/10* (2013.01)
(58) Field of Classification Search
None
See application file for complete search history.

(56) References Cited

U.S. PATENT DOCUMENTS

| | | | | |
|---|---|---|---|---|
| 6,574,220 | B1* | 6/2003 | Petty | 370/395.4 |
| 6,687,225 | B1* | 2/2004 | Kawarai et al. | 370/230.1 |
| 8,605,603 | B2* | 12/2013 | Hill et al. | 370/248 |
| 2002/0129379 | A1* | 9/2002 | Levinson et al. | 725/129 |
| 2004/0244049 | A1* | 12/2004 | Hahin et al. | 725/120 |
| 2009/0161562 | A1* | 6/2009 | Shah et al. | 370/245 |
| 2011/0075574 | A1* | 3/2011 | Perelstain et al. | 370/248 |
| 2011/0268435 | A1* | 11/2011 | Mizutani et al. | 398/5 |
| 2012/0070147 | A1* | 3/2012 | Mizutani et al. | 398/25 |
| 2012/0195191 | A1* | 8/2012 | Saltsidis et al. | 370/228 |
| 2012/0224488 | A1* | 9/2012 | Niibe et al. | 370/241.1 |
| 2013/0091408 | A1* | 4/2013 | O'Connell et al. | 714/819 |
| 2013/0114394 | A1* | 5/2013 | Hu et al. | 370/216 |
| 2013/0128749 | A1* | 5/2013 | Krzanowski et al. | 370/241.1 |
| 2013/0315071 | A1* | 11/2013 | Yoshida et al. | 370/241.1 |

FOREIGN PATENT DOCUMENTS

| | | |
|---|---|---|
| JP | 2004-364168 | 12/2004 |
| JP | 2007-166014 | 6/2007 |

* cited by examiner

*Primary Examiner* — Anh-Vu Ly
(74) *Attorney, Agent, or Firm* — Staas & Halsey LLP

(57) ABSTRACT

An apparatus controls a transmission interval of maintenance packets in a communication network. The apparatus calculates, within a first bandwidth available for the transmission and reception of packets, a second bandwidth that is free in the apparatus and usable for transmitting and receiving the maintenance packets for maintenance of the communication network. The apparatus determines a transmission interval of maintenance packets in accordance with the calculated second bandwidth and transmits the maintenance packets to another apparatus in the communication network at the determined transmission interval.

6 Claims, 32 Drawing Sheets

FIG. 3

| PERIOD NUMBER | TRANSMISSION INTERVAL | LOC DETECTION TIME | BANDWIDTH USED FOR OAM MAINTENANCE AND MONITORING (/MEP) |
|---|---|---|---|
| 1 | 3.33 ms | 11 ms | 300 Kbps |
| 2 | 10 ms | 35 ms | 100 Kbps |
| 3 | 100 ms | 350 ms | 10 Kbps |
| 4 | 1 s | 3.5 s | 1 Kbps |
| 5 | 10 s | 35 s | 0.1 Kbps |
| 6 | 1 min | 3.5 min | 0.01 Kbps |
| 7 | 10 min | 35 min | 0.001 Kbps |

FIG. 5A

| MEP | LINE IF | VLAN | VLAN BAND-WIDTH | MEP NAME | MEG LEVEL | ID | OAM AVAILABLE BANDWIDTH RATE ||
|---|---|---|---|---|---|---|---|---|
| | | | | | | | Tx | Rx |
| MEP10 | GbE | 10 | 5 Mbps | MEP[A1] | 7 | 101 | 0.9 | 0.9 |
| | | XX | X Mbps | ... | | | | |
| | | ... | ... | ... | | | | |
| | | XX | X Mbps | ... | | | | |
| MEP20 | 10GbE | 10 | 1 Mbps | MEP[B1] | 7 | 51 | 0.9 | 0.9 |
| | | XX | X Mbps | ... | | | | |
| | | ... | ... | ... | | | | |
| | | XX | X Mbps | ... | | | | |
| MEP30 | GbE | 10 | 2 Mbps | MEP[C1] | 7 | 21 | 0.2 | 0.3 |
| | | | | MEP[C2] | 4 | 22 | 0.3 | 0.3 |
| | | | | MEP[C3] | 1 | 23 | 0.4 | 0.4 |
| | | XX | X Mbps | ... | | | | |
| | | ... | ... | ... | | | | |
| | | XX | X Mbps | ... | | | | |

| MEP | MEP NAME | CPU USAGE RATE | PREFERABLE FREE BANDWIDTHS OF PERIODS | | | | | | |
|---|---|---|---|---|---|---|---|---|---|
| | | | 3.33 ms | 10 ms | 100 ms | 1 s | 10 s | 1 min | 10 min |
| MEP10 | MEP[A1] | 0-20 % | 350 K | 150 K | 15 K | ○ | ○ | ○ | ○ |
| | | 21-80 % | × | 150 K | 15 K | ○ | ○ | ○ | ○ |
| | | 81-100 % | × | × | 15 K | ○ | ○ | ○ | ○ |
| MEP20 | MEP[B1] | 0-10 % | × | 300 K | 30 K | 5 K | 1 K | ○ | ○ |
| | | 11-30 % | × | × | 30 K | 5 K | 1 K | ○ | ○ |
| | | 31-70 % | × | × | × | 5 K | 1 K | ○ | ○ |
| | | 71-100 % | × | × | × | × | × | ○ | ○ |
| MEP30 | MEP[C1] | 0-20 % | 500 K | 200 K | 20 K | 2 K | 1 K | ○ | ○ |
| | | 21-50 % | × | 200 K | 20 K | 2 K | 1 K | ○ | ○ |
| | | 51-90 % | × | × | 20 K | 2 K | 1 K | ○ | ○ |
| | | 91-100 % | × | × | × | 2 K | 1 K | ○ | ○ |
| | MEP[C2] | ... | | | | | | | |
| | MEP[C3] | ... | | | | | | | |

× : NOT AVAILABLE IRRESPECTIVE OF FREE BANDWIDTH
○ : AVAILABLE IRRESPECTIVE OF FREE BANDWIDTH

FIG. 6

| | OWN MEP | MEG LEVEL | TRANSMISSION FREE BANDWIDTH | RECEPTION FREE BANDWIDTH |
|---|---|---|---|---|
| ALL BANDWIDTHS IN VLAN | − | − | 1950 K | 1800 K |
| OWN MEP | MEP[C1] | 7 | 390 K | 360 K |
| | MEP[C2] | 4 | 580 K | 540 K |
| | MEP[C3] | 1 | 780 K | 720 K |

| | 183a |
|---|---|
| CORE 0 | 60 % |
| CORE 1 | 80 % |
| ... | ... |
| CORE N | 20 % |
| TARGET CORE NUMBER | 0, 1 |
| TARGET CORE AVERAGE LOAD | 70 % |

FIG. 8

| OPPOSITE MEP NAME | MEPID | MASTER/ SLAVE | SLAVE RESPONSE | RECEPTION FREE BANDWIDTH | CURRENTLY- AVAILABLE PERIOD | CURRENTLY- EXECUTING PERIOD |
|---|---|---|---|---|---|---|
| MEP[A1] | 101 | MASTER | 0 | 4000 K | 10 ms | 1 s |
| MEP[B1] | 51 | SLAVE | 0 | 450 K | 10 ms | 1 s |
| OWN MEP[C1] | 21 | SLAVE | 0 | 360 K | 100 ms | 1 s |

| OWN MEP NAME | MEP[C1] |
|---|---|
| MASTER/SLAVE | SLAVE |
| CURRENTLY-AVAILABLE PERIOD | 100 ms |
| CURRENTLY-EXECUTING PERIOD | 1 s |

| 8 | 7 | 6 | 5 | 4 | 3 | 2 | 1 F |
|---|---|---|---|---|---|---|---|
| RDI | Reserve(0) | | | | PERIOD | | |

FIG. 28

| OPPOSITE MEP NAME | MEPID | MASTER/ SLAVE | SLAVE RESPONSE | RECEPTION FREE BANDWIDTH | CURRENTLY- AVAILABLE PERIOD | CURRENTLY- EXECUTING PERIOD |
|---|---|---|---|---|---|---|
| MEP[A1] | 101 | MASTER | 0 | 4000 K | 10 ms | 100 ms |
| MEP[B1] | 51 | SLAVE | 0 | 450 K | 10 ms | 1 s |
| OWN MEP[C1] | 21 | SLAVE | 0 | 360 K | 100 ms | 1 s |

| OPPOSITE MEP NAME | MEPID | MASTER/ SLAVE | SLAVE RESPONSE | RECEPTION FREE BANDWIDTH | CURRENTLY- AVAILABLE PERIOD | CURRENTLY- EXECUTING PERIOD |
|---|---|---|---|---|---|---|
| OWN MEP[A1] | 101 | MASTER | 0 | 4000 K | 10 ms | 100 ms |
| MEP[B1] | 51 | SLAVE | 1 | 450 K | 10 ms | 100 ms |
| MEP[C1] | 21 | SLAVE | 1 | 360 K | 100 ms | 100 ms |

APPARATUS AND METHOD FOR CONTROLLING A TRANSMISSION INTERVAL OF MAINTENANCE PACKETS IN A COMMUNICATION NETWORK

CROSS-REFERENCE TO RELATED APPLICATION

This application is based upon and claims the benefit of priority from the prior Japanese Patent Application No. 2012-118029, filed on May 23, 2012, the entire contents of which are incorporated herein by reference.

FIELD

The embodiment discussed herein is related to apparatus and method for controlling a transmission interval of maintenance packets in a communication network.

BACKGROUND

In general, an Ethernet OAM (Operation Administration and Maintenance) protocol based on the ITU-T Y. 1731 and the IEEE 802.1ag has been used as a protocol for maintaining and monitoring networks. In the Ethernet OAM protocol, an MEP (Maintenance entity group End Point) and an MIP (Meg Intermediate Point) are defined as components. The MEP and the MIP are located in an end point and an intermediate point in a path (ME: Maintenance Entity), respectively, and monitor a communication network in a unit of path connecting the MEP and the MIP with each other. The ME is defined for each MEG (Maintenance Entity Group) level that represents a layer to be monitored and is set in a communication network such as a VLAN (Virtual Local Area Network).

As a typical network monitoring function of the Ethernet OAM protocol, a CC (Continuity Check) function has been used, for example. With this CC function, each MEP periodically transmits a CCM (Continuity Check Message) packet in a multicasting manner through an MIP to all opposite MEPs included in the same MEG. Accordingly, each of the MEPs may check continuity among the MEPs in the same MEG by monitoring reception of CCM packets transmitted from the other opposite MEPs. Since each of the MEPs periodically transmits CCM packets at an even time interval, when one of the MEPs does not receive CCM packets from the other opposite MEPs for a predetermined period of time (for example, 3.5 times a periodic transmission interval), it is determined that the continuity is not attained. By this, the MEP may detect network failure.

SUMMARY

According to an aspect of the invention, there is provided an apparatus for controlling a transmission interval of maintenance packets in a communication network. The apparatus calculates, within a first bandwidth available for the transmission and reception of packets, a second bandwidth that is free in the apparatus and usable for transmitting and receiving maintenance packets for maintenance of the communication network. The apparatus determines a transmission interval of maintenance packets in accordance with the calculated second bandwidth and transmits the maintenance packets to another apparatus in the communication network at the determined transmission interval.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of correspondence relationships between transmission intervals of continuity check message (CCM) packets and bandwidths used for OAM maintenance and monitoring;

FIG. 5A is a diagram illustrating a basic setting of a user setting table, according to an embodiment;

FIG. 5B is a diagram illustrating a setting example of preferable free bandwidths of individual periods in a user setting table, according to an embodiment;

FIG. 6 is a diagram illustrating an example of data stored in a transmission/reception free bandwidth table, according to an embodiment;

FIG. 7 is a diagram illustrating an example of data stored in a central processing unit (CPU) load table, according to an embodiment;

FIG. 8 is a diagram illustrating an example of data stored in an opposite MEP table, according to an embodiment;

FIG. 9 is a diagram illustrating an example of data stored in a period management table, according to an embodiment;

FIG. 10B is a diagram illustrating an example of a format of a flag, according to an embodiment;

FIG. 28 is a diagram illustrating an example of data stored in an opposite MEP table after update performed in accordance with a determination of a currently-executing period, according to an embodiment;

FIG. 30 is a diagram illustrating an example of data stored in an opposite MEP table after updating performed in accordance with a response to notification of a currently-executing period, according to an embodiment.

DESCRIPTION OF EMBODIMENT

However, the technique of detecting failure described above has the following problems. In the Ethernet OAM protocol, seven values (for example, values from 3.33 ms to 10 min) are defined as transmission intervals of CCM packets transmitted from MEPs. A transmission interval is fixed to a certain value (1 min, for example) by a network administrator before monitoring of a network is started and is not dynamically changed thereafter. Furthermore, as described above, since a period of time used to detect failure is determined as a multiple number of the transmission interval (3.5 times, for example), the smaller the transmission interval set by the administrator is (3.33 ms, for example), the earlier the network failure is detected. Accordingly, change of a packet transmission path and recovery of communication may be performed early.

However, when the transmission interval is fixed to a small value, although a period of time used to detect failure is reduced, a bandwidth for maintenance used by the MEPs in the network is increased. For example, in the CC function, when a transmission interval is set at "10 min", a bandwidth used for maintenance is only "0.001 Kbps". However, when a transmission interval is fixed to "3.33 ms", a bandwidth used for maintenance is increased to "300 Kbps". When the network is maintained and monitored, it is desired that each of the MEPs utilizes an appropriate bandwidth which does not give adverse effect to the network, so as to ensure an efficient traffic amount for actual data communication. Accordingly, each of the MEPs is forced to select a large transmission interval so that a bandwidth used for maintenance is narrowed (on other words, a bandwidth used for actual data communication is widened), in preparation for possibility of unexpected increase in a traffic amount and the like. This constitutes a limiting factor of reducing a time needed for detecting a network failure.

Hereinafter, an embodiment of a communication control device and a communication control method will be described in detail with reference to the accompanying drawings. Note that the communication control device and the communication control method according to the embodiment are not limited to the example below.

Figure 1:
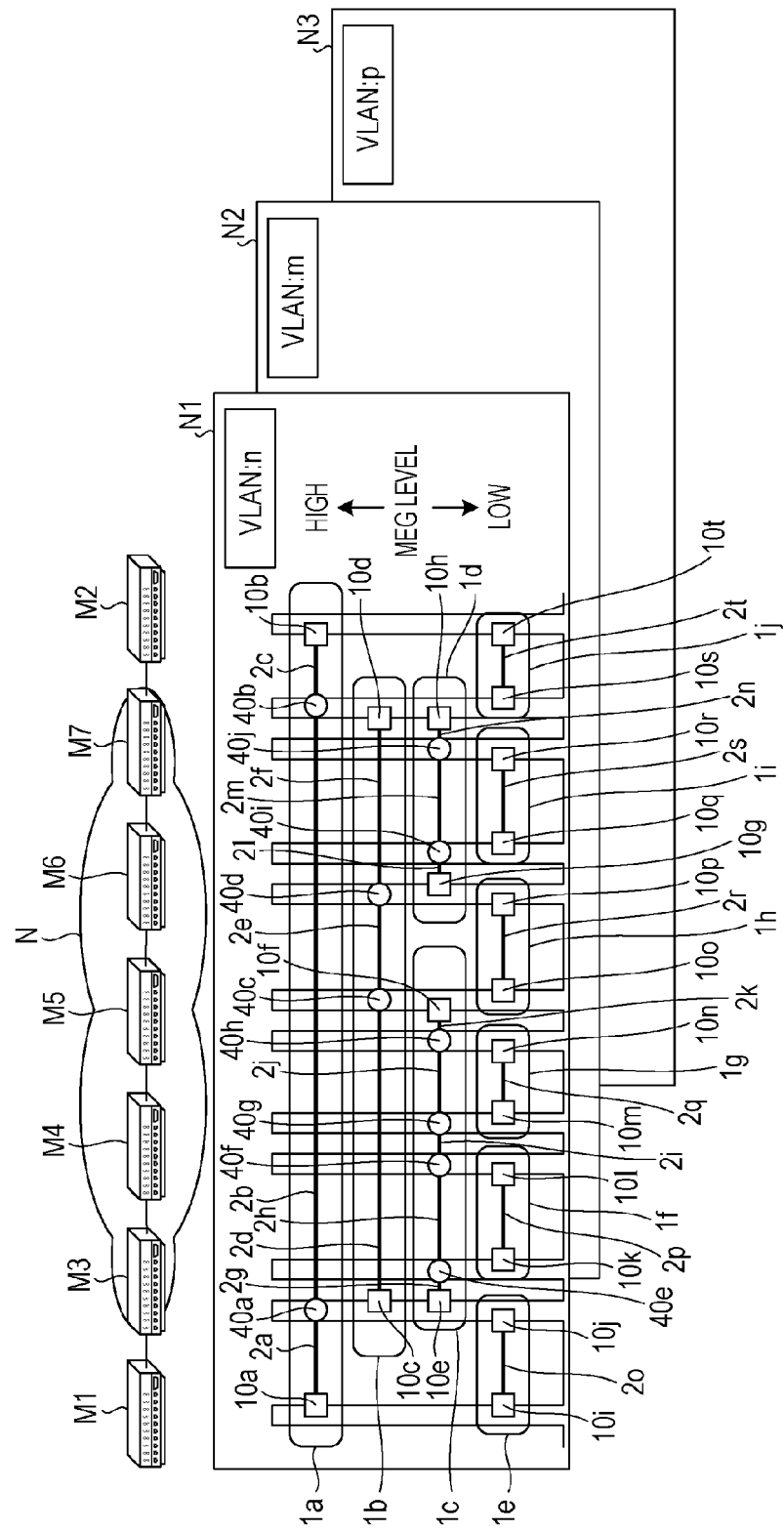
FIG. 1 is a diagram illustrating an example of a communication network employing an Ethernet operation administration and maintenance (OAM) protocol, according to an embodiment.

FIG. 1 is a diagram illustrating an example of a communication network employing an Ethernet OAM protocol, according to an embodiment. As illustrated in FIG. 1, an L2VPN (Virtual Private Network) N includes a plurality of VLANs (Virtual Local Area Networks) N1 to N3. Each of the VLANs N1 to N3 includes a plurality of MEGs (Maintenance Entity Group) 1a to 1j having different levels as monitoring units. The MEG 1a includes MEPs (MEG End Points) 10a and 10b and MIPs (MEG Intermediate Points) 40a and 40b, the MEG 1b includes MEPs 10c and 10d and MIPs 40c and 40d, the MEG 1c includes MEPs 10e and 10f and MIPs 40e to 40h, the MEG 1d includes MEPs 10g and 10h and MIPs 40i and 40j, the MEG 1e includes MEPs 10i and 10j, the MEG 1f includes MEPs 10k and 10l, the MEG 1g includes MEPs 10m and 10n, the MEG 1h includes MEPs 10o and 10p, the MEG 1i includes MEPs 10q and 10r, and the MEG 1j includes MEPs 10s and 10t. Adjacent MEPs, adjacent MIPs, and adjacent MEP and MIP are connected by MEs (Maintenance Entity) 2a to 2t with each other.

A communication control system according to the embodiment may be realized in a network employing an Ethernet OAM protocol. The Ethernet OAM protocol is defined by the ITU-TY. 1731 and the IEEE 802.1ag and used for maintenance and monitoring. The MEPs 10a to 10t are end points of monitoring and the MIPs 40a to 40j are intermediate points of the MEPs. The monitoring is executed for each ME. MEs are defined for each VLAN and each MEG level. MEG levels are set for monitoring areas layered by levels in a unit of layer. For example, lower levels (0 to 2, for example) are set for monitoring between physical IFs (Interfaces) and middle levels (3 and 4, for example) are set for monitoring a provider. Higher levels (5 to 7, for example) are set for customers. As illustrated in FIG. 1, in the communication control system of this embodiment, a plurality of MEPs and MIPs may be defined in the same VLAN and the different MEPs monitor different paths.

Figure 2:
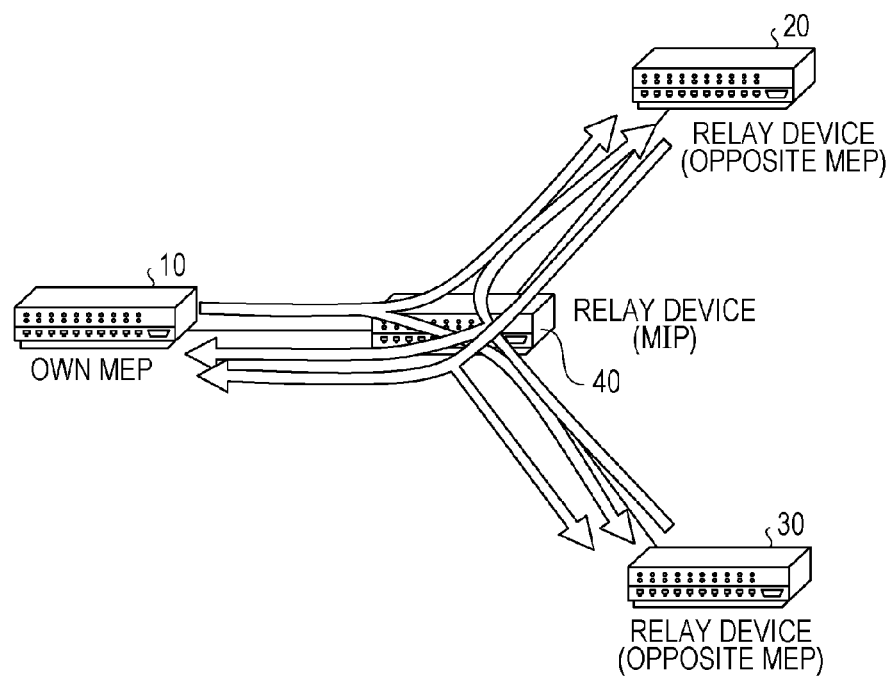
FIG. 2 is a diagram illustrating an example of a continuity check (CC) function of the Ethernet OAM protocol, according to an embodiment.

FIG. 2 is a diagram illustrating an example of a CC (Continuity Check) function of the Ethernet OAM protocol, according to an embodiment. In the CC function, a certain MEP (an own MEP 10, for example) checks continuity with other MEPs (opposite MEPs 20 and 30, for example). As illustrated in FIG. 2, the MEPs 10, 20, and 30 perform multicast transmission in asynchronous manner so as to periodically transmit CCM (Continuity Check Message) packets. Furthermore, each of the MEPs 10, 20, and 30 monitors reception of the CCM packets transmitted from the other MEPs (opposite MEPs) which belong to the same MEG. For example, the MEP 10 receives CCM packets transmitted from all the other opposite MEPs 20 and 30. Since the MEPs 20 and 30 perform the multicast transmission, each of the packets transmitted from the MEPs 20 and 30 are supplied to all the other MEPs by one packet transmission. Although all the MEPs 10, 20, and 30 included in the same MEG transmit the CCM packets in the asynchronous manner, the transmission of the CCM packets is performed, for each MEP, at a common time interval. Therefore, when the own MEP 10 does not receive the CCM packets supplied from the opposite MEPs 20 and 30 for a predetermined period of time defined by the protocol (3.5 times a periodic transmission interval, for example), the own MEP 10 determines that a monitoring result is negative (discontinuity) and detects network failure. Hereinafter, for ease of explanation, a periodic transmission interval of CCM packets will also be expressed simply as "period".

FIG. 3 is a diagram illustrating an example of correspondence relationships T1 between transmission intervals of CCM packets and bandwidths used for OAM maintenance and monitoring. As illustrated in FIG. 3, seven transmission intervals ("periods") of CCM packets periodically transmitted from the MEPs 10, 20, and 30 are defined by the protocol in association with period numbers "1" to "7". Note that the transmission intervals "3.33 ms" to "10 min" are uniquely determined in the same MEG by a network administrator before monitoring of continuity is started in accordance with the Ethernet OAM protocol, and are not dynamically changed after the determination. Furthermore, each of bandwidths used for OAM maintenance and monitoring of "300 Kbps" to "0.001 Kbps" is a value per 1 MEP obtained when a byte length of a CCM packet is 100 bytes.

As illustrated in FIG. 3, the smaller a transmission interval of a CCM packet is, the shorter a period of time needed for LOC (Loss Of Continuity) detection is. Accordingly, the MEP 10 may detect a state in which network failure has occurred in an early stage and may take countermeasure such as change of a path. However, in this case, a wider bandwidth is used for detection of discontinuity. On the other hand, when a transmission interval is long (1 min or more, for example), a narrower bandwidth is used. However, in this case, a long period of time is used to detect network failure. As described above, the tradeoff relationship is established between the transmission intervals of the CCM packets and the bandwidths used for the OAM maintenance and monitoring.

Figure 4:
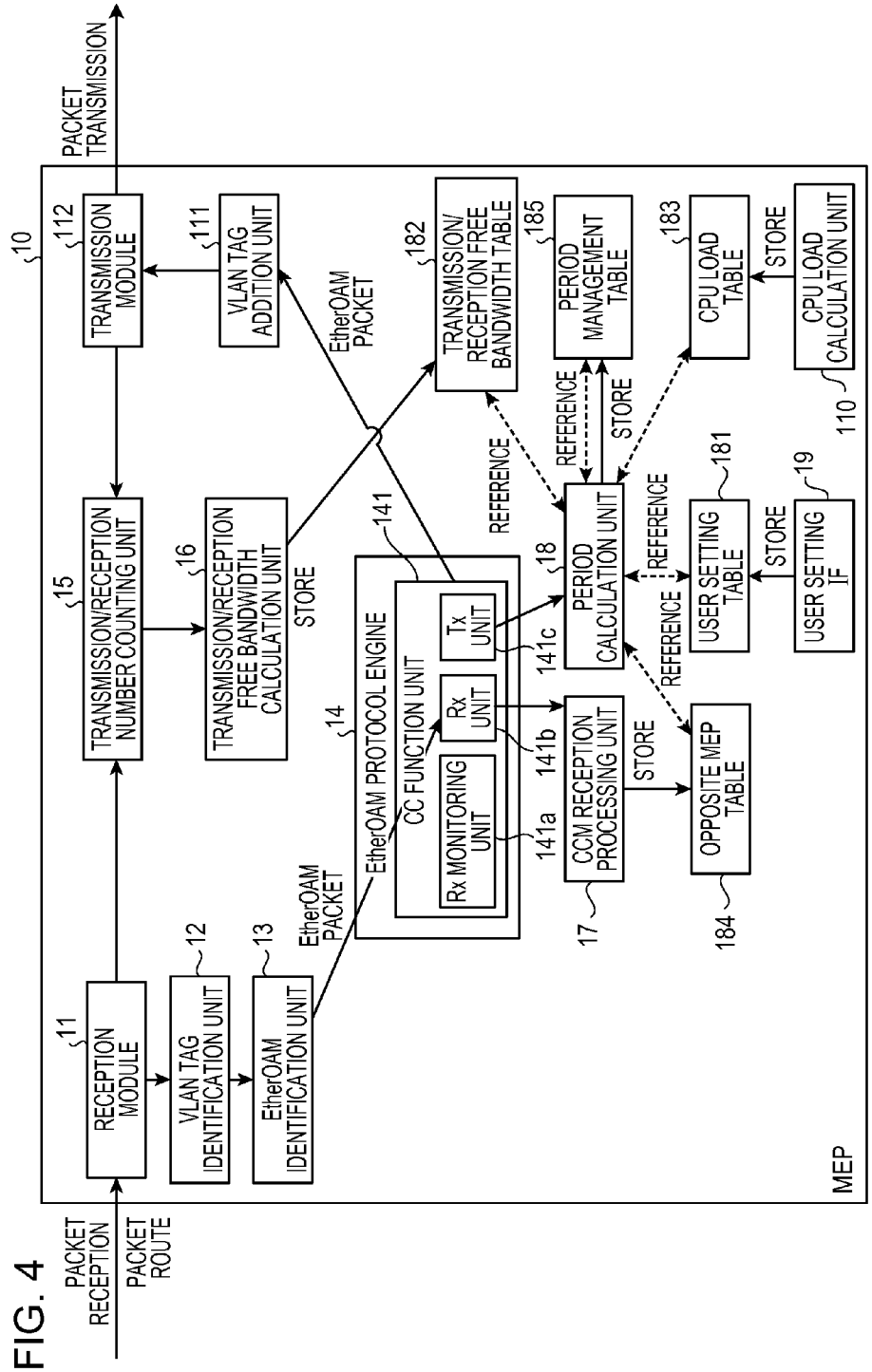
FIG. 4 is a diagram illustrating a configuration example of a maintenance entity group end point (MEP), according to an embodiment.

A configuration of a communication control device (an MEP and an MIP) according to an embodiment will be described. FIG. 4 is a diagram illustrating a configuration example of a MEP, according to an embodiment. As illustrated in FIG. 4, the MEP 10 includes a reception module 11, a VLAN tag identification unit 12, an EtherOAM identification unit 13, an EtherOAM protocol engine 14, a transmission/reception number counting unit 15, and a transmission/reception free bandwidth calculation unit 16. The MEP 10 further includes a CCM reception processing unit 17, a period calculation unit 18, a user setting IF 19, a CPU load calculation unit 110, a VLAN tag addition unit 111, and a transmission module 112. These components are connected to one another so as to input and output signals and packets in an one-way manner or in a bidirectional manner.

The reception module 11 receives all packets including an EtherOAM packet supplied to the MEP 10 through a packet route. The VLAN tag identification unit 12 determines whether VLAN tags have been assigned to the individual packets received by the reception module 11. Furthermore, the VLAN tag identification unit 12 determines whether a VLANID to be processed which is set by a user is obtained in accordance with results of the determination. The VLAN tag identification unit 12 discards packets which are determined as packets not to be processed. The EtherOAM identification unit 13 filters EtherOAM packets from the packets received by the reception module 11 in accordance with a result of the determination performed by the VLAN tag identification unit 12. After the filtering, the EtherOAM packets are input to the EtherOAM protocol engine 14, and the other packets are processed as actual packets.

The EtherOAM protocol engine 14 realizes a maintenance and monitoring function of the MEP 10. The EtherOAM protocol engine 14 realizes various support functions including the CC function. The EtherOAM protocol engine 14 performs transmission/reception management on the EtherOAM packets supplied from the EtherOAM identification unit 13 and internal state management, for example. The EtherOAM protocol engine 14 includes a CC function unit 141. The CC function unit 141 includes an Rx monitoring unit 141*a*, an Rx unit 141*b*, and a Tx unit 141*c*. The Rx monitoring unit 141*a* performs control of monitoring of opposite MEPs. The Rx unit 141*b* performs reception of CCM packets. The Tx unit 141*c* performs transmission of CCM packets.

The transmission/reception number counting unit 15 counts the number of packets for each VLAN which are received by the reception module 11 when reception of the EtherOAM packets is started. Furthermore, the transmission/reception number counting unit 15 counts the number of packets for each VLAN which are transmitted by the transmission module 112, which will be described hereinafter, when transmission of the EtherOAM packets is started. The transmission/reception free bandwidth calculation unit 16 calculates a transmission free bandwidth and a reception free bandwidth of the MEP 10 using a count value supplied from the transmission/reception number counting unit 15 with reference to setting information including a VLAN assignment bandwidth (available bandwidth) and a rate of an OAM available bandwidth. A result of the calculation is stored in a transmission/reception free bandwidth table 182, which will be described hereinafter.

The CCM reception processing unit 17 analyzes a CCM packet supplied from the EtherOAM protocol engine 14 so as to obtain information (such as reception free bandwidths, currently-available periods, and currently-executing periods of the opposite MEPs 20 and 30) assigned to the CCM packet. The obtained information is stored in an opposite MEP table 184. The CCM reception processing unit 17 compares ID numbers of all the MEPs 10, 20, and 30 which belong to the same MEG with one another so as to identify one of the MEPs 10, 20, and 30 which has the largest ID number as a master MEP. When an MEP which is a transmission source of the received CCM packet is the master MEP, the CCM reception processing unit 17 compares a currently-executing period of the master MEP and a currently-executing period of the own MEP 10 with each other. As a result of the comparison, when the periods (periodic transmission intervals) do not coincide with each other, the CCM reception processing unit 17 updates the currently-executing period of the own MEP 10 so that the currently-executing period of the own MEP 10 coincides with the currently-executing period of the master MEP. Note that, when the own MEP 10 corresponds to the master MEP, that is, the MEP which is the transmission source of the received CCM packet does not correspond to the master MEP, the comparison process described above is not performed.

The period calculation unit 18 obtains information including the reception free bandwidths of the opposite MEP 20 and 30, the transmission free bandwidth of the own MEP 10, a load of a CPU (Central Processing Unit), and a rate of an OAM available bandwidth from the transmission/reception free bandwidth table 182, a CPU load table 183, the opposite MEP table 184, and a period management table 185 and determines a currently-available period of the own MEP 10 in accordance with the obtained information. The determined currently-available period is stored in the period management table 185. Furthermore, the period calculation unit 18 compares the ID numbers of all the MEPs 10, 20, and 30 which belong to the same MEG with one another and determines that the own MEP 10 is a master MEP when the ID number of the own MEP 10 is the largest and otherwise determines that the own MEP 10 is a slave MEP. When the MEP 10 is a master MEP, a currently-executing period is determined in accordance with the currently-available periods of the opposite MEPs 20 and 30 and the currently-available period of the own MEP 10 and is stored in the period management table 185. On the other hand, when the own MEP 10 is a slave MEP, the currently-executing period is simply stored in the period management table 185. Furthermore, the period calculation unit 18 obtains information including the calculated reception free bandwidth of the own MEP 10, the calculated currently-available period of the own MEP 10, and the calculated currently-executing period of the own MEP 10 from the transmission/reception free bandwidth table 182 and the period management table 185 and adds the obtained information to a CCM packet.

Note that, when a value of the currently-executing period of the master MEP 10 is updated, the MEP 10 notifies the slave MEPs 20 and 30 of the updated period by a CCM packet. When receiving the notification, the slave MEPs 20 and 30 update the currently-executing periods, store the updated periods in respective CCM packets, and transmit CCM packets to the master MEP 10. When receiving the CCM packets, the CCM reception processing unit 17 of the master MEP 10 recognizes that the values of the periods are actually updated on the slave sides.

The user setting IF 19 stores setting information including preferable free bandwidths of individual periods in a user setting table 181 for each MEP. The CPU load calculation unit 110 calculates a current CPU load at a time of transmission of a CCM packet and stores a result of the calculation in the CPU load table 183. The VLAN tag addition unit 111 adds a VLAN tag to a packet which is instructed to be transmitted by an upper layer. The transmission module 112 transmits all packets including an EtherOAM packet including a VLAN tag assigned thereto to a given address.

Next, examples of data setting in the tables 181 to 185 will be described. FIG. 5A is a diagram illustrating a basic setting of a user setting table 181a. As illustrated in FIG. 5A, in the user setting table 181a, a type of line interface (line IF), a type of VLAN, a bandwidth of a VLAN, a MEP name, a MEG level, a MEP identifier (ID), and an OAM available bandwidth rate are stored in association with each of MEPs. The OAM available bandwidth rate is set for each of a transmission side (Tx) and a reception side (Rx). The OAM available bandwidth rate represents a rate of a bandwidth available for the corresponding MEP as OAM traffic on the assumption that the entire corresponding VLAN bandwidth (5 Mbps, for example) is set at 1. For example, referring to the uppermost row among rows associated with the MEP 30, the MEP 30 may use 0.4 (=2×0.2) Mbps in an entire VLAN bandwidth of 2 Mbps as a transmission free bandwidth. Furthermore, the MEP 30 may use 0.6 (=2×0.3) Mbps in 2 Mbps as a reception free bandwidth.

FIG. 5B is a diagram illustrating a setting of preferable free bandwidths of individual periods in a user setting table 181b. Here, "period" means a periodic transmission interval of CCM packets as mentioned above. As illustrated in FIG. 5B, in the user setting table 181b, a MEP name, a CPU usage rate, and preferable free bandwidths of individual periods are stored in association with each of MEPs. Here, the preferable free bandwidths of periods represent lower limit values of free bandwidths needed for realizing individual periodic transmission intervals (periods) associated with each of CPU usage rates. Furthermore, a cross mark represents that periodic transmission of CCM packets is unavailable with respect to the corresponding period, irrespective of a free bandwidth, and a circle represents that periodic transmission of a CCM packet is available with respect to the corresponding period, irrespective of a free bandwidth.

For example, referring to data in the uppermost row among rows associated with the MEP 10, even when the CPU has enough room (usage rate of 0 to 20%), the MEP 10 uses a free bandwidth of at least 350 Kbps in order to realize periodic transmission at a short interval of 3.33 ms. However, only a free bandwidth of 150 Kbps or more is enough for periodic transmission at an interval of 10 ms, and only a free bandwidth of 15 Kbps or more is enough for periodic transmission at an interval of 100 ms. Furthermore, periodic transmission at an interval of 1 s or more may be realized irrespective of an amount of a free bandwidth.

For example, in the MEP 20, when the CPU has an enough room (usage rate of 0 to 10%), a free bandwidth of 300 Kbps ore more is enough for periodic transmission of CCM packets at a time interval of 10 ms. However, when the CPU does not have enough room (usage rate of 31 to 70%), the MEP 20 is unable to perform periodic transmission at an interval of 100 ms or less irrespective of a free bandwidth (even when a free bandwidth is 100%). Furthermore, when a CPU usage rate is larger than 70%, a currently-available period of the MEP 20 is equal to or larger than 1 min irrespective of a free bandwidth. For example, referring to data in the lowermost row among rows associated with the MEP 30, when the CPU does not have enough room (usage rate of 91 to 100%), the MEP 30 may not perform periodic transmission at an interval of 100 ms or less but a free bandwidth of 2 Kbps or more is enough for periodic transmission at an interval of 1 s. Furthermore, periodic transmission at an interval of 1 min or more may be realized even when a free bandwidth is "0".

Note that values stored as the preferable free bandwidths of individual periods (350 k and 5 k, for example) and boundary values of the CPU usage rates (20% and 70%, for example) may be appropriately set and changed by a user in accordance with capability of the CPU of the MEP devices and the number of defined MEPs.

FIG. 6 is a diagram illustrating an example of data stored in a transmission/reception free bandwidth table 182a. As illustrated in FIG. 6, in the transmission/reception free bandwidth table 182a, "1950 Kbps" and "1800 Kbps" which may be updated are stored as a sum of transmission free bandwidths and a sum of reception free bandwidths in a VLAN, respectively. Furthermore, in the transmission/reception free bandwidth table 182a, a MEG level, the transmission free bandwidth, and the reception free bandwidth are stored in association with each of MEPs defined for the respective levels. The period calculation unit 18 recognizes that a transmission free bandwidth of a MEP[C1] at an MEG level "7" is currently "390 Kbps" and a reception free bandwidth thereof is currently "360 Kbps" with reference to the transmission/reception free bandwidth table 182a.

FIG. 7 is a diagram illustrating an example of data stored in a CPU load table 183a. As illustrated in FIG. 7, in the CPU load table 183a, N+1 core usage rates (N is a natural number) are stored in association with the respective core identifiers. Note that "target core number" indicating a core which operates an own MEP may be set and changed by the user. For example, when the target core number is "0, 1", an average value "70%" of a usage rate "60%" of a core 0 and a usage rate "80%" of a core 1 is stored as "target core average load". The CPU load calculation unit 110 recognizes that a current CPU usage rate is "70%", for example, with reference to the CPU load table 183a.

FIG. 8 is a diagram illustrating an example of data stored in an opposite MEP table 184a. As illustrated in FIG. 8, in the opposite MEP table 184a, MEP IDs, discrimination between a master and a slave, a reception free bandwidth, a currently-available period, and a currently-executing period are stored in association with each of opposite MEPs. Furthermore, when one of the MEPs which includes the opposite MEP table 184a serves as a master MEP, information representing whether responses from slave MEPs have been obtained is stored as "a slave response". The period calculation unit 18 recognizes that an opposite MEP [A1] serves as a master MEP having a reception free bandwidth of "4000 Kbps", for example, with reference to the opposite MEP table 184a. Furthermore, the period calculation unit 18 recognizes that the MEP[A1] is available up to a period of "10 ms" and a currently-executing period is set at "1 s".

FIG. 9 is a diagram illustrating an example of data stored in a period management table 185a. As illustrated in FIG. 9, in the period management table 185a, "slave" is registered as discrimination between a master and a slave of an own MEP [C1], and in addition, "100 ms" and "1 s" are stored as a currently-available period and a currently-executing period of the own MEP[C1], respectively. The period calculation unit 18 recognizes that the MEP[C1] serves as a slave MEP, for example, with reference to the period management table 185a. Furthermore, the period calculation unit 18 recognizes that the MEP[C1] is available up to a period of "100 ms" and a currently-executing period is set at "1 s".

Although the configuration of the MEP 10 has been described above as a representative example, the MEPs 20 and 30 and an MIP 40 have configurations the same as that of the MEP 10. Therefore, common components are denoted by reference numerals having the same last numbers, and detailed descriptions thereof are omitted. For example, the user may cause the MEPs 10, 20, and 30 to function as MIPs by changing settings of the EtherOAM protocol engine 14 and EtherOAM protocol engines 24 and 34. Alternatively, the user may cause the MIP 40 to have a function of an MEP by changing a setting of an EtherOAM protocol engine 44.

Figure 10A:
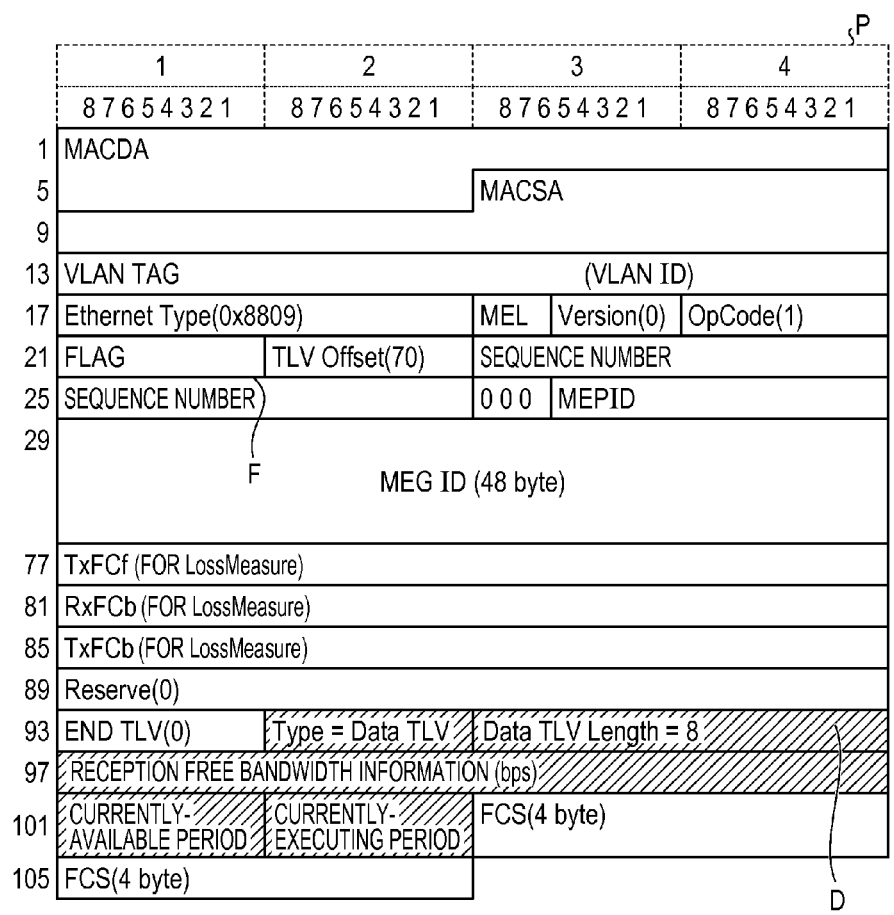
FIG. 10A is a diagram illustrating an example of a format of a continuity check message (CCM) packet, according to an embodiment.
Figure 10B:
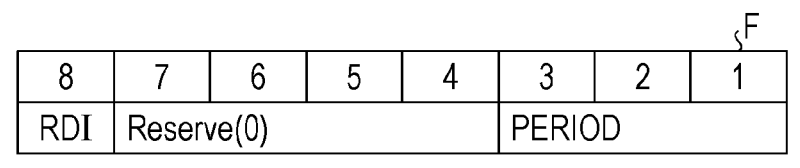

Next, a configuration of a CCM packet will be described. FIG. 10A is a diagram illustrating an example of a format of a CCM packet, according to an embodiment. As illustrated in FIG. 10A, a CCM packet P includes a PADDING region D (shaded portion). Information included in the PADDING region D is defined by DataTLV of the OAM protocol. The PADDING region D has predetermined bytes (for example, nine bytes) and may store arbitrary data. In this embodiment, information including at least a reception free bandwidth, a currently-available period, and a currently-executing period is stored in the PADDING region D. FIG. 10B is a diagram illustrating an example of a format of a flag F, according to an embodiment. As illustrated in FIG. 10B, the flag F may store information of eight bits in total which includes one bit for an RDI (Remote Defect Indication) region, four bits for a reserved region, and three bits for a period region.

Next, an operation will be described. Hereinafter, although an operation of the MEP 10 serving as a master MEP and an operation of the MEP 20 serving as a slave MEP will be described as representative examples, as with the description of the configuration, the MEP 30 and the MIP 40 may be configured to perform similar operations.

Figure 11:
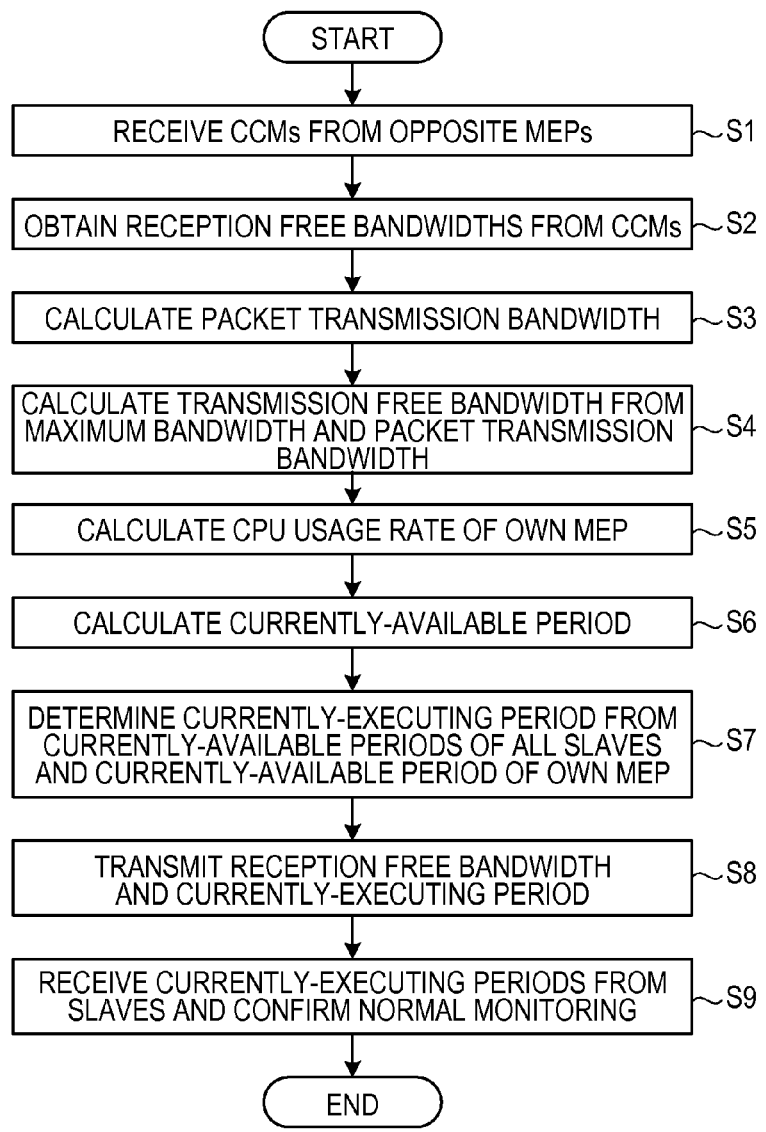
FIG. 11 is a diagram illustrating an example of an operational flowchart of a MEP on a master side, according to an embodiment.

FIG. 11 is a diagram illustrating an example of an operational flowchart of a MEP on a master side, according to an embodiment. First, when the reception module 11 of the MEP 10 receives CCM packets from the opposite MEPs 20 and 30 (S1), the CCM reception processing unit 17 obtains information on reception free bandwidths stored in the received CCM packets (S2). Meanwhile, the transmission/reception free bandwidth calculation unit 16 calculates a transmission bandwidth for packets (for actual traffic) other than OAM packets (for maintenance and monitoring) for each VLAN (S3), and thereafter, calculates a transmission free bandwidth based on a result of the calculation and the maximum bandwidth (S4). Furthermore, the CPU load calculation unit 110 calculates a CPU usage rate of the own MEP 10 at a current time point (S5). Note that processes in step S1 to step S5 are performed to collect parameters used to calculate a currently-available period of the MEP 10, and the order of performing the processes may be changed.

Although a detailed method for calculating a period will be described hereinafter, in step S6, a currently-available period of the own MEP 10 is calculated using the parameters collected in step S1 to step S5 and preferable free bandwidth definition information of individual periods set by the user. Furthermore, the period calculation unit 18 finally determines a currently-executing period in the MEG using currently-available periods stored in the CCM packets supplied from the other MEPs 20 and 30 (all slave MEPs) which belong to the same MEG and the currently-available period calculated in step S6 (S7).

In step S8, the EtherOAM protocol engine 14 adds numeric values of the reception free bandwidths obtained in step S2 and the currently-executing period finally determined in step S7 to a PADDING region of a CCM packet to be transmitted. The transmission module 112 transmits the CCM packet to a predetermined address. The CCM reception processing unit 17 determines whether the currently-executing periods received from the slave MEPs 20 and 30 coincide with the currently-executing period finally determined in step S7 when the next CCM packet is transmitted (S9). When the determination is affirmative, the CCM reception processing unit 17 determines that maintenance and monitoring is allowed to be continued in a normal way, and otherwise, the CCM reception processing unit 17 determines that the maintenance and monitoring is not allowed to be continued in the normal way and notifies the network administrator of the fact.

Figure 12:
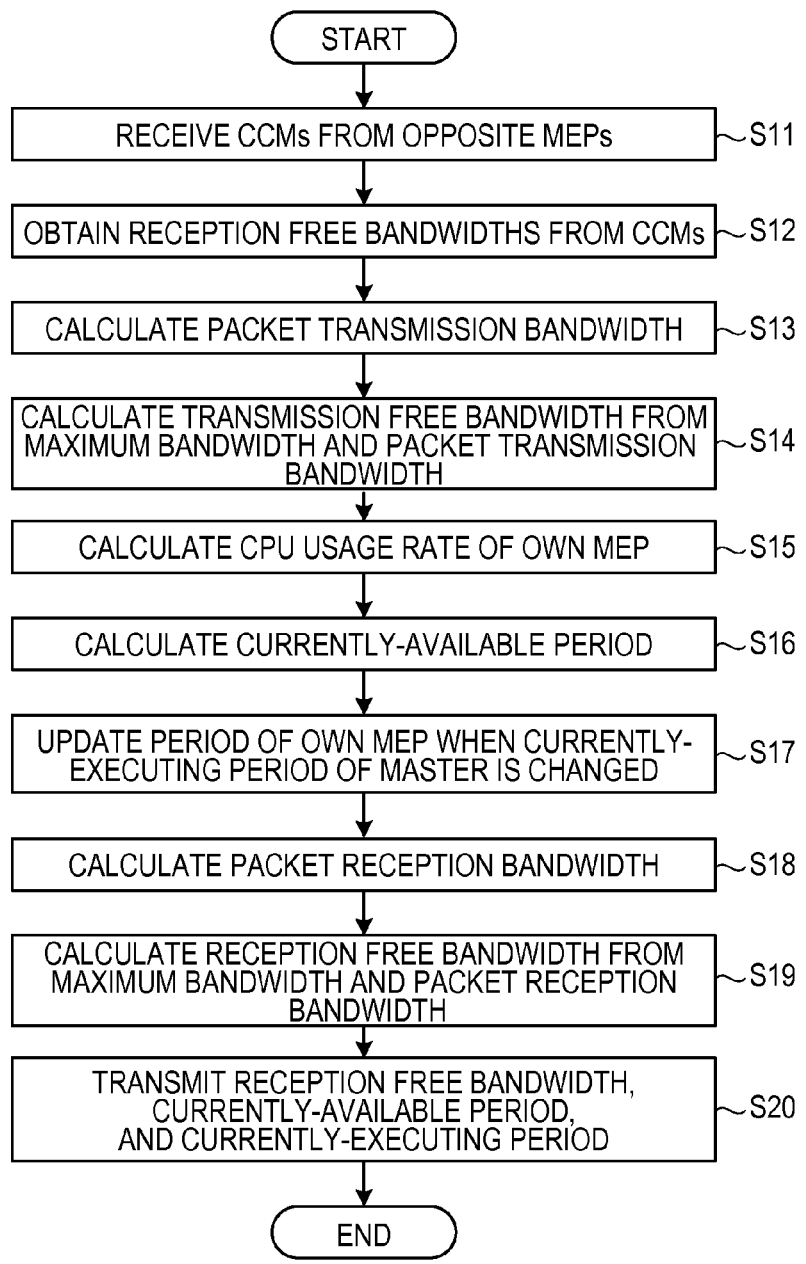
FIG. 12 is a diagram illustrating an example of an operational flowchart of a MEP on a slave side, according to an embodiment.

FIG. 12 is a diagram illustrating a example of an operational flowchart of a MEP on a slave side, according to an embodiment. The operation of the MEP 20 on the slave side includes processes the same as those included in the operation of the MEP 10 on the master side described above, and therefore, detailed descriptions of the common steps are omitted. For example, processes in step S11 to step S16 in FIG. 12 are the same as those in step S1 to step S6 described with reference to FIG. 11 except that the MEP 20 on the slave side performs the processes. Hereinafter, processes in step S17 onwards will be described.

In step S17, a period calculation unit 28 determines whether a value of a currently-executing period stored in a CCM packet supplied from the master MEP 10 which belongs to the same MEG has been changed from the previous value. As a result of the determination, when the value of the currently-executing period has been changed, the period calculation unit 28 updates a currently-executing period of the own MEP 20 stored in a period management table 285 in accordance with the change of the value of the currently-executing period of the master MEP 10. In step S18 and step S19, processes similar to those performed in step S3 and step S4 described above are executed. Specifically, the transmission/reception free bandwidth calculation unit 26 calculates a reception bandwidth for packets other than OAM packets for each VLAN (S18), and thereafter, calculates a reception free bandwidth based on a result of the calculation and the maximum bandwidth (S19). Thereafter, the EtherOAM protocol engine 24 adds numeric values of the reception free bandwidth obtained in step S19, a currently-available period of the own MEP 20 calculated in step S16, and the currently-executing period updated in step S17 to a PADDING region of a CCM packet to be transmitted. A transmission module 212 transmits the CCM packet to a predetermined address (S20).

Next, operations of the MEPs 10, 20, and 30 according to an embodiment will be described in detail with reference to FIGS. 13 to 21. In operations described below, a network environment is assumed in which a bandwidth control based on QoS (Quality of Service) functions for each VLAN and available bandwidths are limited for individual VLANs.

Figure 13:
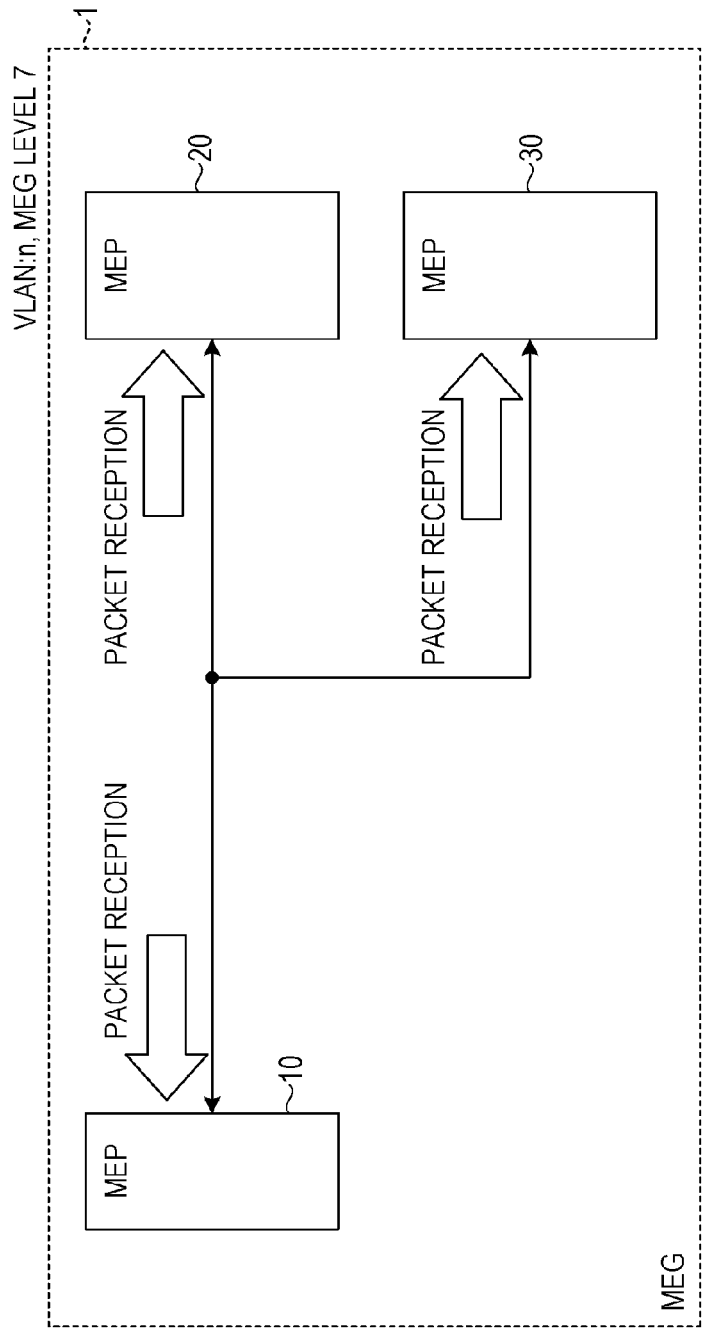
FIG. 13 is a schematic diagram illustrating an example of a process for calculating a reception free bandwidth, according to an embodiment.

FIG. 13 is a schematic diagram illustrating an example of a process for calculating a reception free bandwidth performed by each of the MEPs 10, 20, and 30. As illustrated in FIG. 13, in an MEG 1 according to the embodiment, the three MEPs 10, 20, and 30 perform monitoring on a VLAN n at a MEG level 7. Each of the MEPs 10, 20, and 30 receives a normal packet other than a CCM packet and calculates a packet reception rate (bps) for each VLAN. Furthermore, each of the MEPs 10, 20, and 30 subtracts a reception bandwidth representing an actual traffic amount from the maximum bandwidth which is available for packet reception and stored in a memory of the device. By this, an available free bandwidth is calculated.

Figure 14:
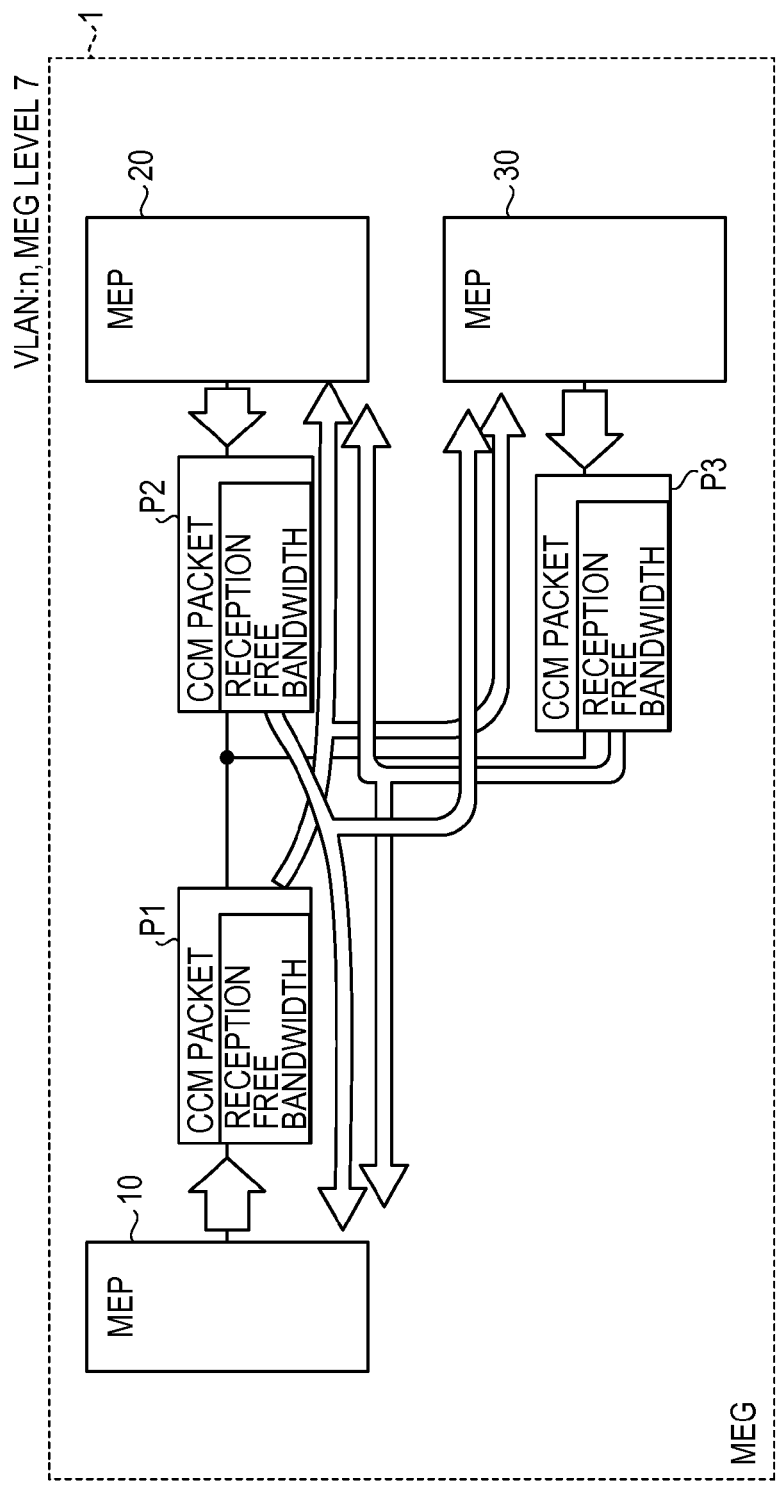
FIG. 14 is a schematic diagram illustrating an example of a process for notifying a reception free bandwidth, according to an embodiment.

FIG. 14 is a schematic diagram illustrating an example of a process for notifying the other MEPs of a reception free bandwidth performed by each of the MEPs 10, 20, and 30. As illustrated in FIG. 14, each of the MEPs 10, 20, and 30 notifies the other MEPs included in the same MEG 1 of information representing the calculated reception free bandwidth using a CCM packet. Each of the MEPs 10, 20, and 30 transmits a reception free bandwidth to the other opposite MEPs by adding the reception free bandwidth calculated by the own MEP to a PADDING region of a corresponding one of CCM packets P1, P2, and P3 which are periodically transmitted in a multicast manner to the other opposite MEPs.

Figure 15:
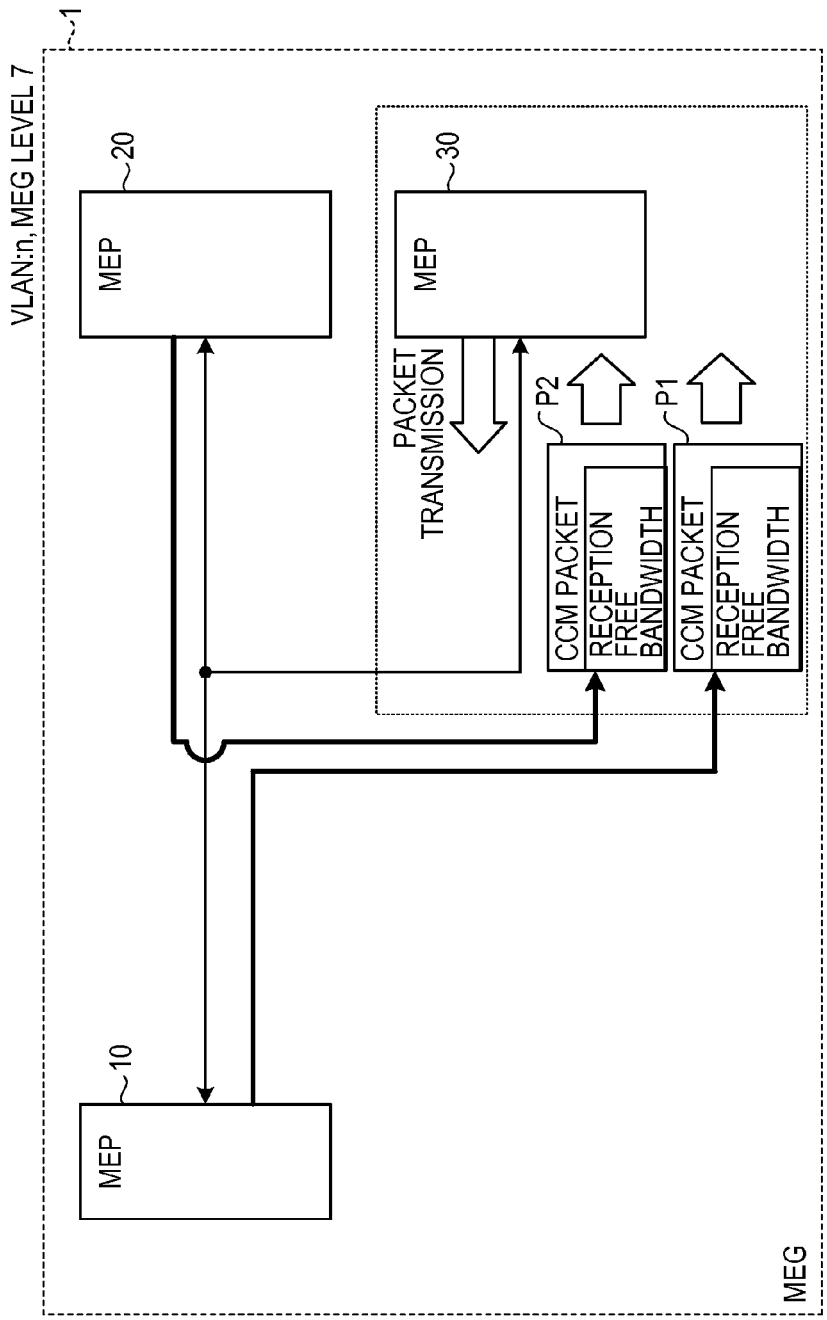
FIG. 15 is a schematic diagram illustrating an example of a process for calculating a free bandwidth, according to an embodiment.

FIG. 15 is a schematic diagram illustrating an example of a process for calculating a free bandwidth based on reception free bandwidths and a transmission free bandwidth, performed by the MEP 30. Hereinafter, a case of the MEP 30 among the MEPs 10, 20, and 30 is taken as a representable example and a process performed by the MEP 30 is representatively described. However, the other MEPs 10 and 20 also perform similar processes. As illustrated in FIG. 15, the MEP 30 calculates a free bandwidth taking a packet arrival capability into consideration in accordance with the reception free bandwidths supplied from the other MEPs 10 and 20 and the transmission free bandwidth calculated by the MEP 30. Upon receiving the CCM packets P1 and P2 from all the opposite MEPs 10 and 20, the MEP 30 collects information on the reception free bandwidths of the opposite MEPs 10 and 20 from the PADDING regions included in the packets P1 and P2. As with the method on the reception side, the MEP 30 may calculate a transmission free bandwidth of the own device in accordance with a packet transmission rate (bps) for each VLAN. The MEP 30 calculates a free bandwidth taking packet reachability into consideration in accordance with the information on the reception free bandwidths and information on the transmission free bandwidth.

Figure 16:
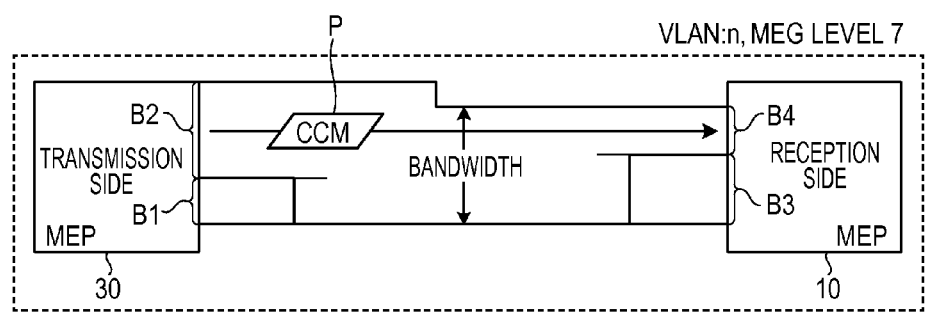
FIG. 16 is a schematic diagram illustrating an example of a bandwidth used for packet communication between MEPs, according to an embodiment.

FIG. 16 is a schematic diagram illustrating an example of a bandwidth used for packet communication between the MEPs 30 and 10. In FIG. 16, a bandwidth B1 is used when the MEP 30 transmits normal packets other than a CCM packet P, and a bandwidth B2 is a remaining unused bandwidth (the transmission free bandwidth described above). Similarly, a bandwidth B3 is used when the MEP 10 receives normal packets other than the CCM packet P, and a bandwidth B4 is a remaining unused bandwidth (the reception free bandwidth described above). The bandwidths B1 and B3 are used for actual data transmission/reception traffic, and the bandwidths B2 and B4 are used for maintenance and monitoring traffic. As illustrated in FIG. 16, even when the transmission free bandwidth of the MEP 30 has enough room, if the reception free bandwidth of the MEP 10 does not have enough room, an efficient bandwidth for maintenance is not ensured between the MEPs 30 and 10. Therefore, when the MEP 30 confirms reachability of the CCM packet P between the MEP 30 and the opposite MEP 10, information on the transmission free bandwidth and information on the reception free bandwidth are needed.

Figure 17:
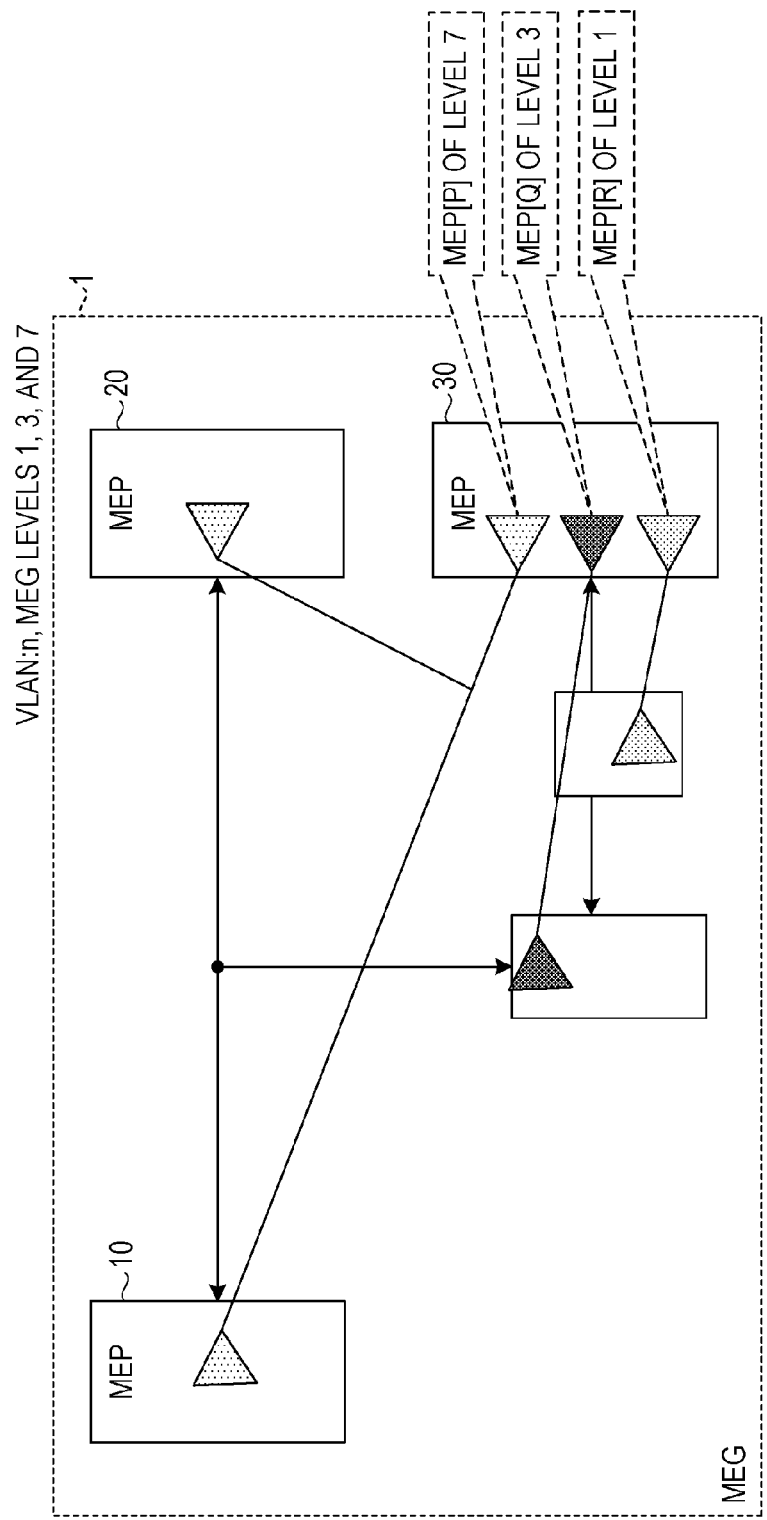
FIG. 17 is a schematic diagram illustrating an example of a process for calculating a free bandwidth when three MEPs in different maintenance entity group (MEG) levels are defined, according to an embodiment.

Here, in the communication control system of the embodiment, different MEPs in different MEG levels may be defined in a single VLAN. FIG. 17 is a schematic diagram illustrating an example of a process for calculating a free bandwidth when three MEPs in different MEG levels are defined. As illustrated in FIG. 17, in the MEP 30, an MEP[P] of a level 7, an MEP[Q] of a level 3, and an MEP[R] of a level 1 are defined as three MEPs in different levels. The MEP 30 calculates, as with the case of FIG. 15, a free bandwidth taking packet reachability into consideration in this state.

Figure 18:
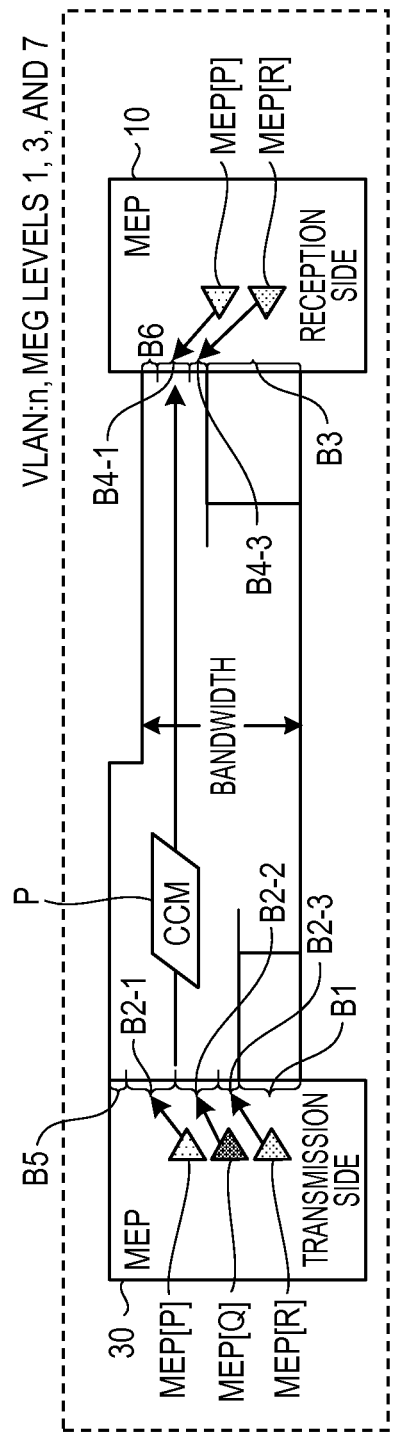
FIG. 18 is a schematic diagram illustrating an example of a bandwidth used for packet communication between MEPs in different MEG levels, according to an embodiment.

FIG. 18 is a schematic diagram illustrating an example of a bandwidth used for packet communication between the MEPs 30 and 10 when three MEPs in different MEG levels are defined. In FIG. 18, a bandwidth B1 is used when the MEP 30 transmits normal packets other than a CCM packet P, and a bandwidth B2 is a remaining unused bandwidth (the transmission free bandwidth described above). In this embodiment, unlike the case of FIG. 16, a plurality of MEP[P], MEP[Q], and MEP[R] in different levels are set in the VLAN n, and therefore, the transmission free bandwidth B2 is shared by the MEP[P], the MEP[Q], and the MEP[R]. As a result, a transmission free bandwidth B2-1 is assigned to the MEP[P] and transmission free bandwidths B2-2 and B2-3 are assigned to the MEP[Q] and the MEP[R], respectively. Furthermore, in order to address sudden increase of traffic, a bandwidth B5 is set as a security margin. Available bandwidth of the MEP[P], the MEP[Q], and the MEP[R] include the security margin and may be set and changed by the user.

Similarly, the bandwidth B3 is used when the MEP 10 receives normal packets other than the CCM packet P, and a bandwidth B4 is a remaining unused bandwidth (the reception free bandwidth described above). The MEP 10 on a reception side receives by itself CCM packets P supplied from all the MEPs which belong to the same MEG 1. Therefore, when viewed from the MEP 30 on a transmission side, one MEP is not allowed to occupy all the reception free bandwidth of the MEP 10 on the reception side, and the reception free bandwidth B4 of the MEP 10 on the reception side is shared by a number of opposite MEPs (two MEPs in FIG. 18). As a result, a reception free bandwidth B4-1 is assigned to the MEP[P] and a reception free bandwidth B4-3 is assigned to the MEP[R]. The MEP 10 on the reception side also preferably includes a security margin similarly to the transmission side. Note that, in this embodiment, since a bandwidth (a free bandwidth) available for maintenance and monitoring is recognized in advance, the MEP 10 only sets a margin having a width considerably smaller than margins in the related art (approximately 10% of the reception free bandwidth B4, for example).

Figure 19:
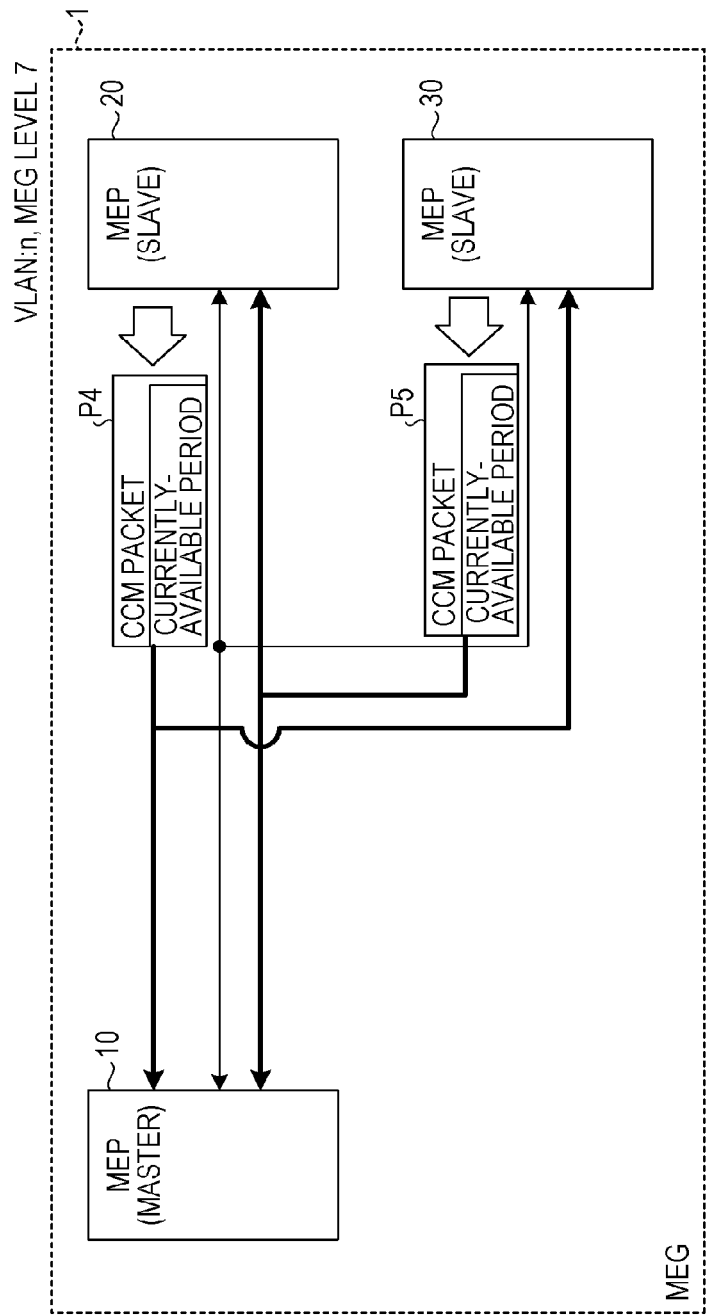
FIG. 19 is a schematic diagram illustrating an example of a process for notifying a currently-available period, according to an embodiment.

FIG. 19 is a schematic diagram illustrating an example of a process for notifying the other MEPs of a currently-available period performed by each of the slave MEPs 20 and 30. It is assumed that determination of a master or a slave is made in accordance with definition of the Ethernet OAM protocol. MEPIDs (1 to 8191, for example) which are not overlapped with one another in the MEG 1 are assigned to MEPs included in the MEG 1. One of the MEPs having the largest ID (8191, for example) in the MEG 1 serves as a master MEP and all the other MEPs serve as slaves. Since the MEPID is information which is to be stored in a CCM format, the MEPs are able to recognize the IDs of all the MEPs which belong to the same MEG 1. Accordingly, each of the MEPs may easily identify whether the own device is a master or a slave, and furthermore, each of the MEPs may easily identify whether the other devices are a master or slaves.

As illustrated in FIG. 19, each of the slave MEPs 20 and 30 stores a period applicable at a current time point as a "currently-available period" in a PADDING region of a corresponding one of CCM packets P4 and P5 and notifies the master MEP 10 of the currently-available period. That is, each of the slave MEPs 20 and 30 determines a currently-available period of the own MEP using the free bandwidth (the transmission free bandwidth and the reception free bandwidth of the own MEP) taking the packet reachability into consideration. For the determination, each of the slave MEPs 20 and 30 may use, in addition to the free bandwidth information, a period available in accordance with a device specification (spec), setting information unique to the device (available free bandwidths of individual periods associated with CPU usage rates, for example) or information set by the user. The MEP 10 collects currently-available periods determined by the MEPs 20 and 30 from the MEPs 20 and 30. Note that, since the MEP 10 serving as the master device finally determines a period, the MEP 10 is not requested to store a currently-available period in a CCM packet and only the MEPs 20 and 30 are requested to store the currently-available periods.

Figure 20:
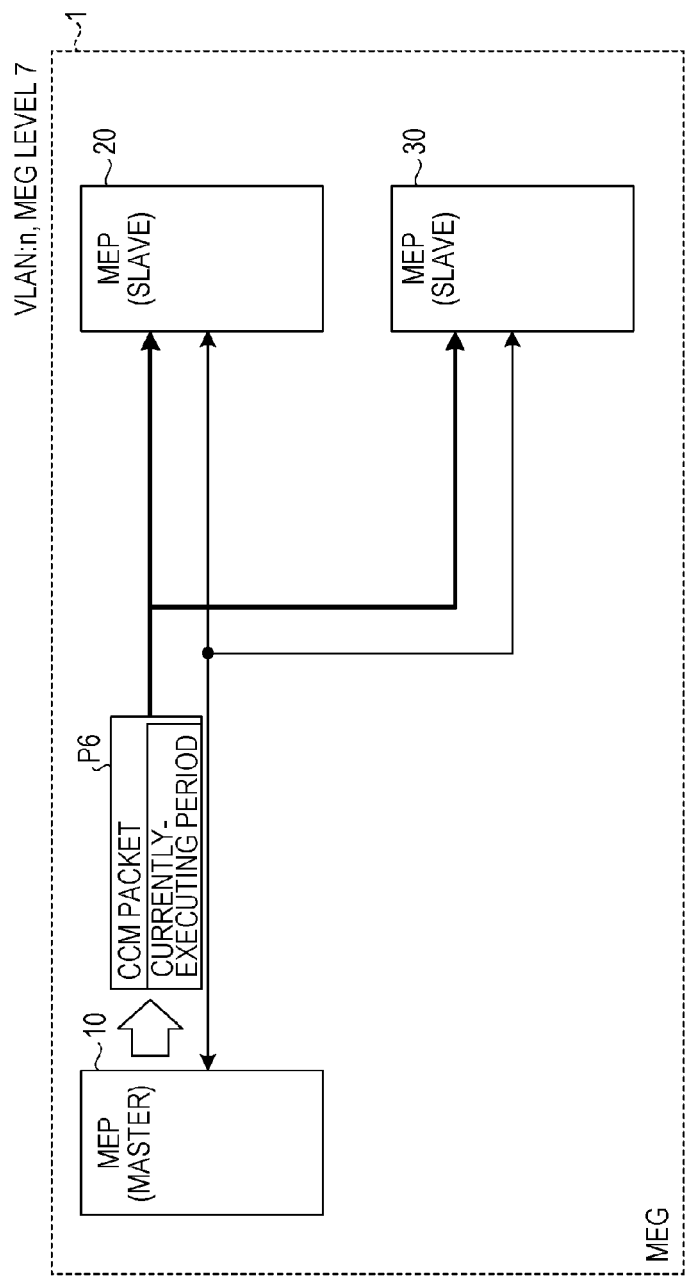
FIG. 20 is a schematic diagram illustrating an example of a process for notifying a currently-executing period, according to an embodiment.

FIG. 20 is a schematic diagram illustrating an example of a process for notifying the other MEPs 20 and 30 of a currently-executing period performed by the master MEP 10. After collecting the currently-available periods from all the MEPs 20 and 30 included in the MEG 1 which includes the MEP 10, the MEP 10 performs a logical sum on values of the currently-available periods so as to determine a shortest period which is executable in the MEG 1 as a "currently-executing period". Then, as illustrated in FIG. 20, the MEP 10 stores a value of the determined currently-executing period in a PADDING region of a CCM packet P6, which is periodically transmitted, and transmits the CCM packet P6 to all the slave MEPs 20 and 30 included in the MEG 1.

Figure 21:
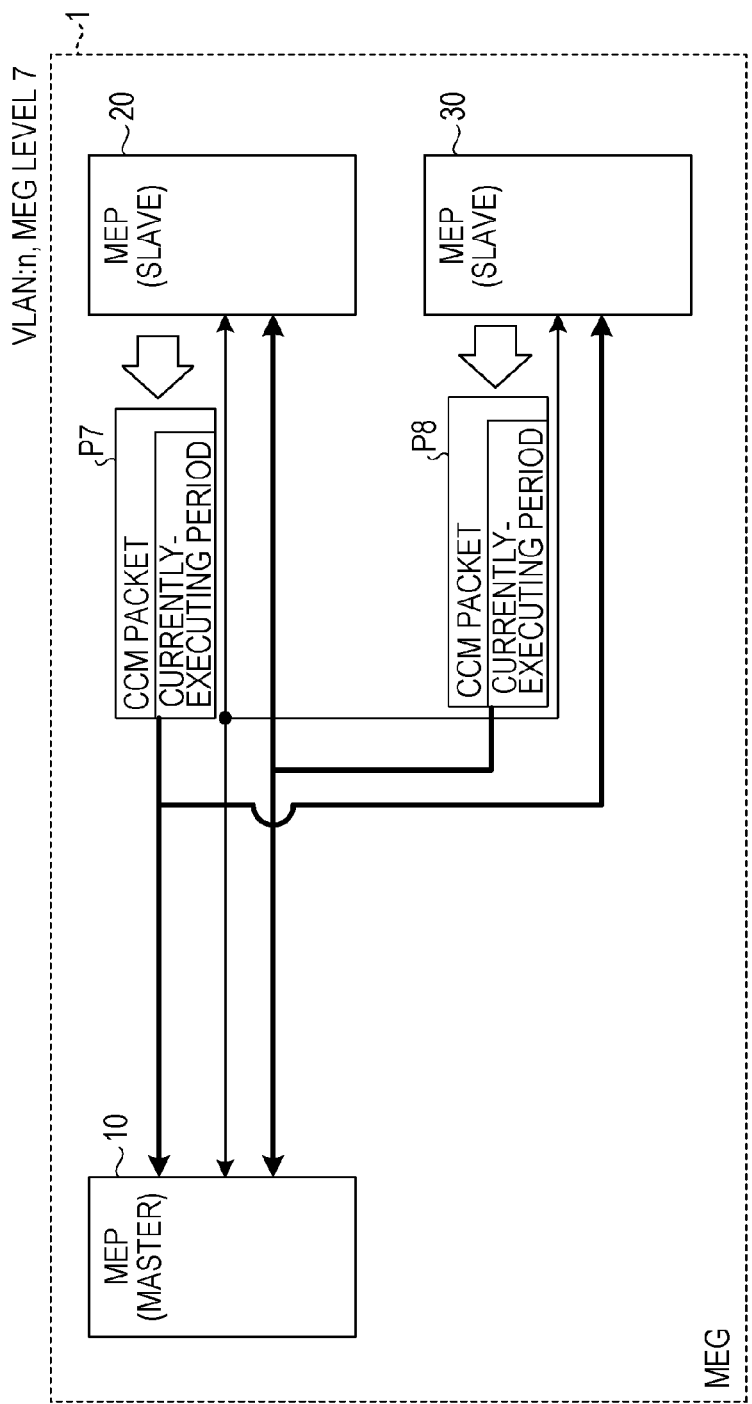
FIG. 21 is a schematic diagram illustrating an example of a process for returning a response in response to notification of a currently-executing period, according to an embodiment.

When receiving the notification of the currently-executing period from the MEP 10, each of the MEPs 20 and 30 returns a response. FIG. 21 is a schematic diagram illustrating an example of a process for returning a response to the other MEPs in response to notification of a currently-executing period performed by each of the slave MEPs 20 and 30. When the master MEP 10 updates the currently-executing period, each of the MEPs 20 and 30 starts monitoring of periodic transmission and periodic reception performed in accordance with the updated currently-executing period. The currently-executing period of the own MEP is added to a PADDING region of a CCM packet transmitted from each of the MEPs 20 and 30 at all time, and a value of the currently-executing period of the packet transmitted from each of the MEPs 20 and 30 is updated in accordance with the update of the currently-executing period performed by the master MEP 10. As illustrated in FIG. 21, the MEPs 20 and 30 transmit CCM packets P7 and P8, respectively, which store the currently-executing periods, to the master MEP 10 and the other slave MEP. Therefore, the MEP 10 may easily recognize that notification and update of the currently-executing periods of all the MEPs 20 and 30 of the transmission sources have been normally completed with reference to the values of the currently-executing periods included in the received CCM packets P7 and P8.

Next, assuming that a CCM packet is periodically transmitted in a period of 1 s, operations of the MEPs 10, 20, and 30 will be further described in detail with reference to FIGS. 22 to 30.

Figure 22:
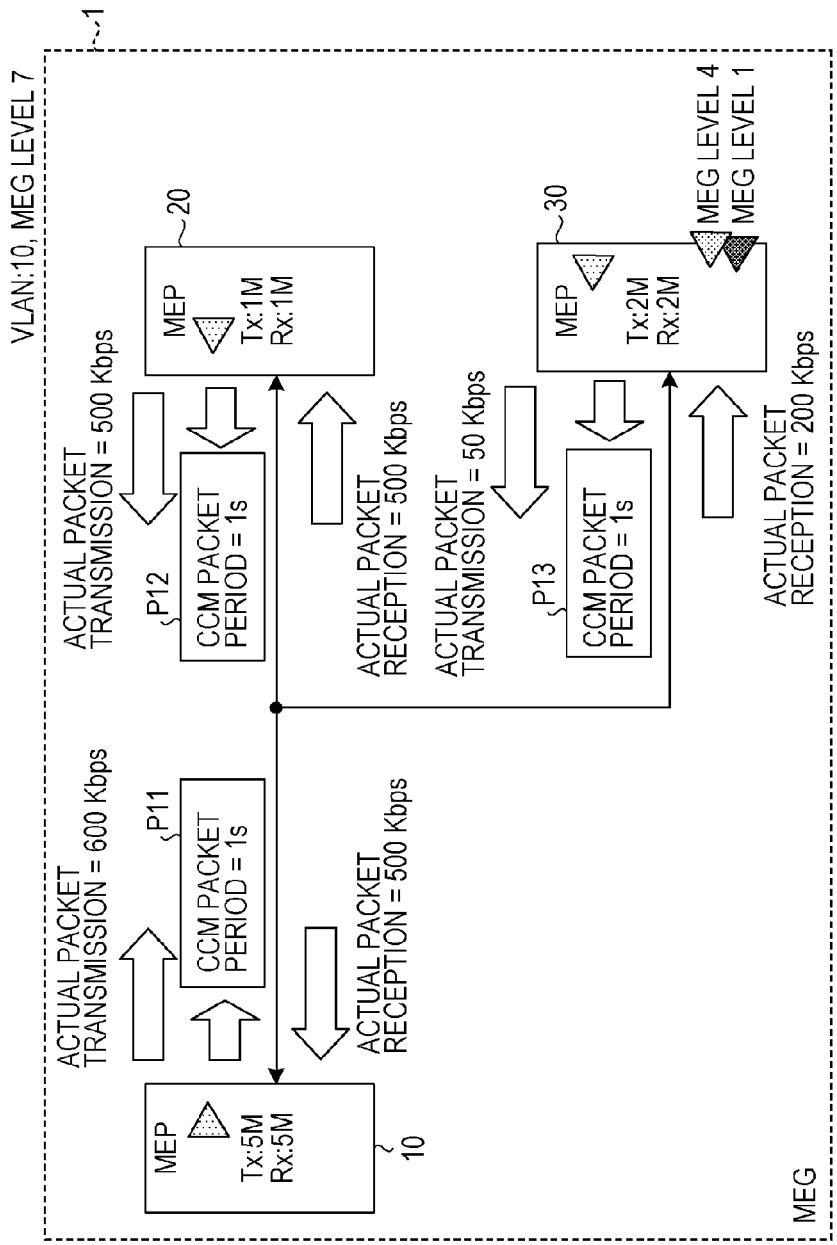
FIG. 22 is a schematic diagram illustrating a state in which actual packets are transmitted and received among MEPs, according to an embodiment.

FIG. 22 is a schematic diagram illustrating a state in which actual packets are transmitted and received among the MEPs 10, 20, and 30. The actual packets mean packets other than packets for maintenance and monitoring (OAM packets) among packets transmitted and received among the MEPs 10, 20, and 30. The actual packets are used in actual data communication. As illustrated in FIG. 22, the MEPs 10, 20, and 30 periodically transmit CCM packets P11, P12, and P13, respectively, at a transmission interval corresponding to a period of 1 s. In particular, the MEP 10 transmits actual packets at a speed of 600 Kbps and receives actual packets at a speed of 500 Kbps. In this case, a transmission VLAN bandwidth Tx of the MEP 10 is 5 Mbps and a reception VLAN bandwidth Rx of the MEP 10 is 5 Mbps. Furthermore, a CPU usage rate is 30%. Meanwhile, the MEP 20 transmits and receives actual packets at a speed of 500 Kbps. In this case, a transmission VLAN bandwidth Tx and a reception VLAN bandwidth Rx of the MEP 20 are 1 Mbps. Furthermore, a CPU usage rate is 5%. Moreover, two types of levels, that is, MEG levels 4 and 1 are defined in the MEP 30. The MEP 30 transmits actual packets at a speed of 50 Kbps and receives actual packets at a speed of 200 Kbps. In this case, a transmission VLAN bandwidth Tx and a reception VLAN bandwidth Rx of the MEP 30 are 2 Mbps. Furthermore, a CPU usage rate is 70%.

Figure 23:
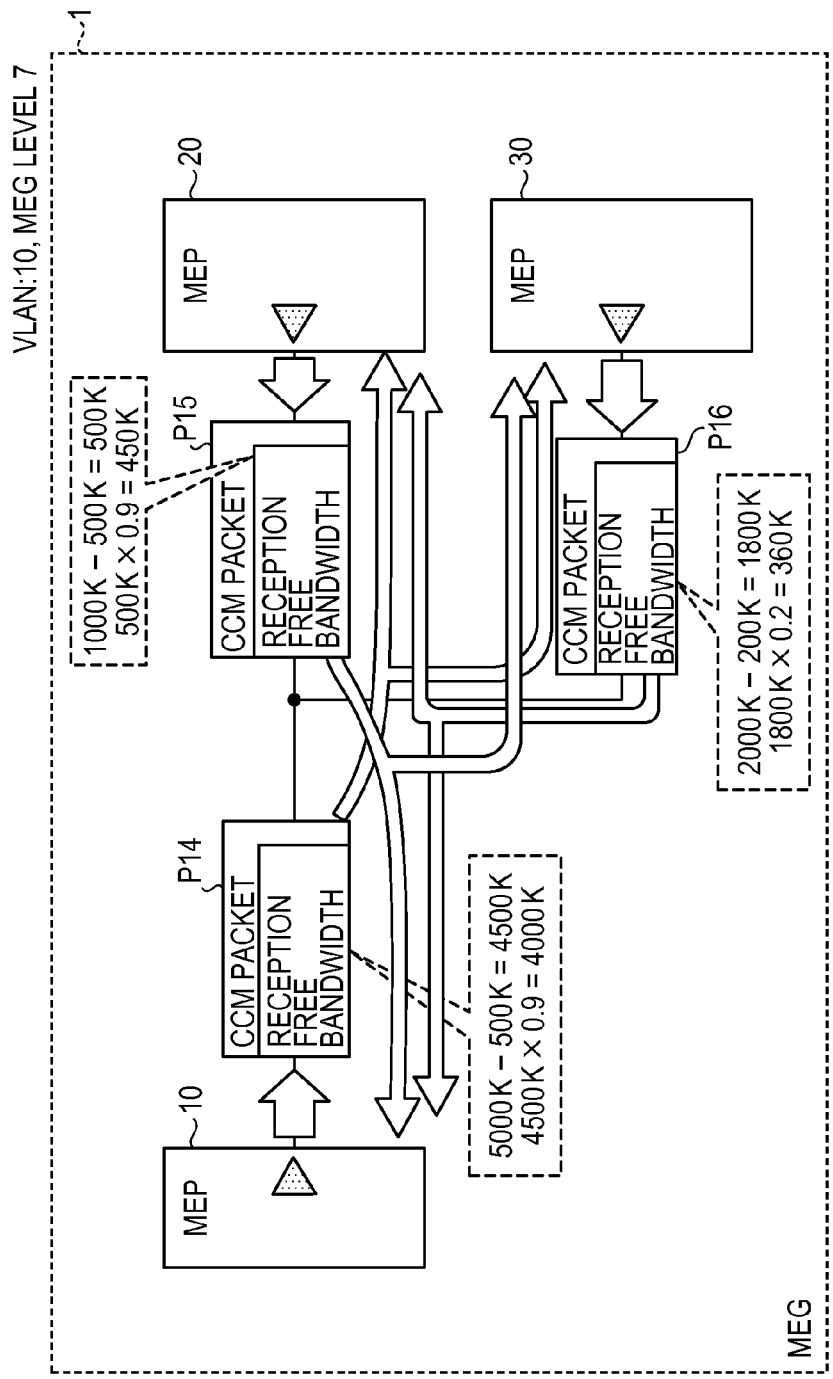
FIG. 23 is a schematic diagram illustrating an example of a process for calculating and notifying a reception free bandwidth, according to an embodiment.

FIG. 23 is a schematic diagram illustrating an example of a process for calculating a reception free bandwidth and notifying the other MEPs of the reception free bandwidth performed by each of the MEPs 10, 20, and 30. As illustrated in FIG. 23, the MEPs 10, 20, and 30 individually calculate own reception free bandwidths, add the reception free bandwidths to CCM packets P14, P15, and P16, respectively, which are periodically transmitted at the currently-executing period, and transmit the CCM packets P14, P15, and P16 to the other MEPs. The reception free bandwidths are calculated in accordance with Equation (1) below.

$$\text{Reception Free Bandwidth} = (\text{VLAN Bandwidth} - \text{Actual Packet Reception Bandwidth}) \times \text{OAM Available Bandwidth Rate} \quad (1)$$

In a case of the MEP 10, for example, since a VLAN bandwidth is 5000 Kbps and an actual packet reception bandwidth at a current time point is 500 Kbps, 4500 (=5000−500) Kbps is multiplied by an OAM available bandwidth rate of 0.9 which is a security margin. As a result, a reception free bandwidth of the MEP 10 of 4000 Kbps is obtained. Similarly, in a case of the MEP 20, since a VLAN bandwidth is 1000 Kbps and an actual packet reception bandwidth at a current time point is 500 Kbps, 500 (=1000−500) Kbps is multiplied by an OAM available bandwidth rate of 0.9 which is a security margin. As a result, a reception free bandwidth of the MEP 20 of 450 Kbps is obtained. Furthermore, in a case of the MEP 30, although a VLAN bandwidth is 2000 Kbps and an actual packet reception bandwidth at a current time point is 200

Kbps, the MEP 30 is shared by three MEPs. Therefore, 1800 (=2000−200) Kbps which is a subtraction value is multiplied by an OAM available bandwidth rate of 0.2, for example, including a security margin. As a result, a reception free bandwidth of the MEP 30 of 360 Kbps is obtained.

Figure 24:
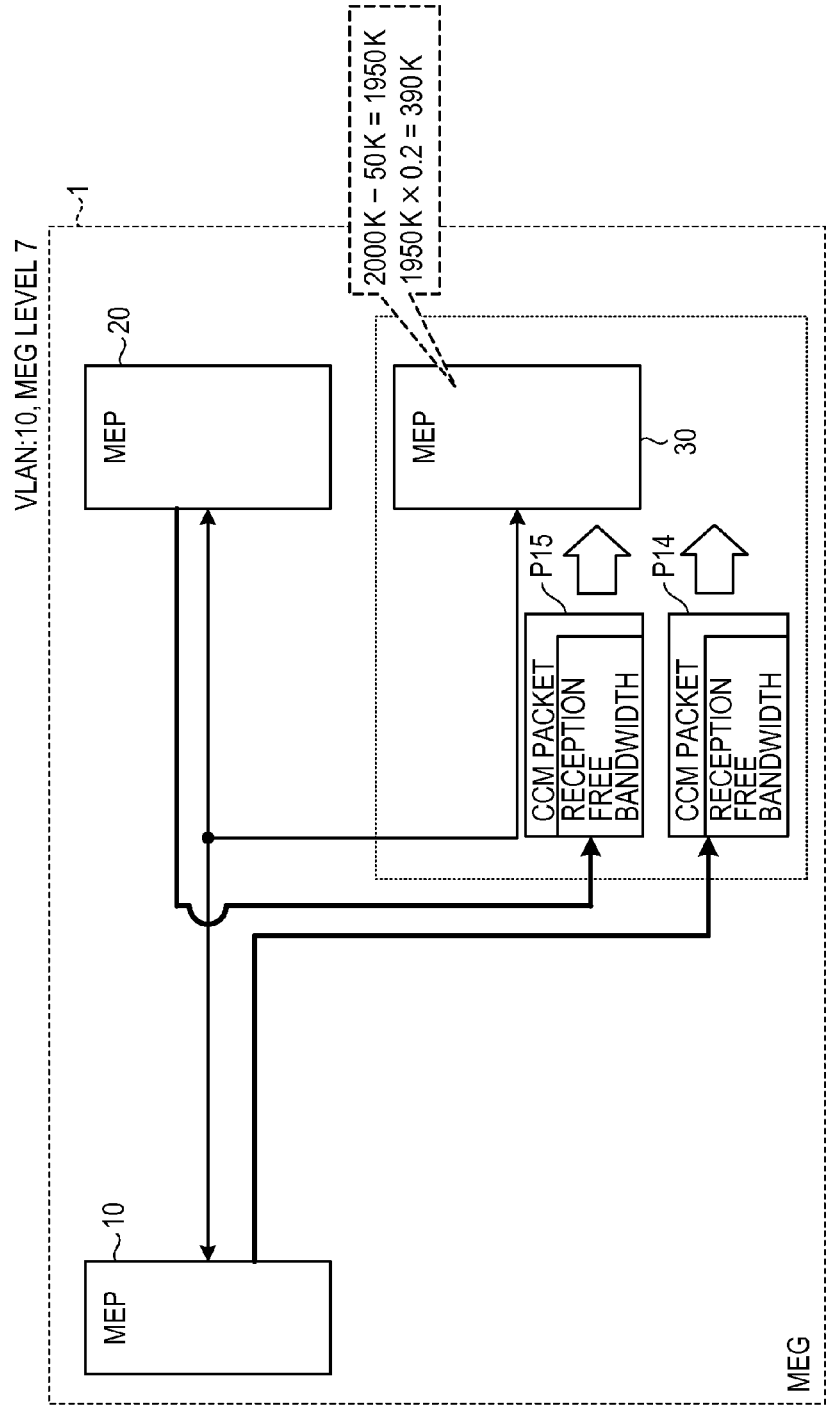
FIG. 24 is a diagram illustrating an example of a process for collecting reception free bandwidths and obtaining a transmission free bandwidth, according to an embodiment.

Hereinafter, although a method for obtaining a reception free bandwidth and a method for calculating a transmission free bandwidth will be described taking the MEP 30 as an representative example, similar processes may be performed by the MEPs 10 and 20. FIG. 24 is a diagram illustrating a process of collecting reception free bandwidths and obtaining a transmission free bandwidth performed by the MEP 30. As illustrated in FIG. 24, the MEP 30 obtains the reception free bandwidth of 4000 Kbps of the MEP 10 from the CCM packet P14 supplied from the MEP 10. Similarly, the MEP 30 obtains the reception free bandwidth of 450 Kbps of the MEP 20 from the CCM packet P15 supplied from the MEP 20. Furthermore, the MEP 30 calculates a transmission free bandwidth of the MEP 30 in accordance with Equation (2) below.

$$\text{Transmission Free Bandwidth} = (\text{VLAN Bandwidth} - \text{Actual Packet Transmission Bandwidth}) \times \text{OAM Available Bandwidth Rate} \qquad (2)$$

For example, in a case of the MEP 30, although a VLAN bandwidth is 2000 Kbps and an actual packet transmission bandwidth at a current time point is 50 Kbps, the MEP 30 is shared by three MEPs. Therefore, 1950 (=2000−50) Kbps is multiplied by an OAM available bandwidth rate of 0.2, for example, including a security margin. As a result, a transmission free bandwidth of the MEP 30 of 390 Kbps is obtained.

Figure 25:
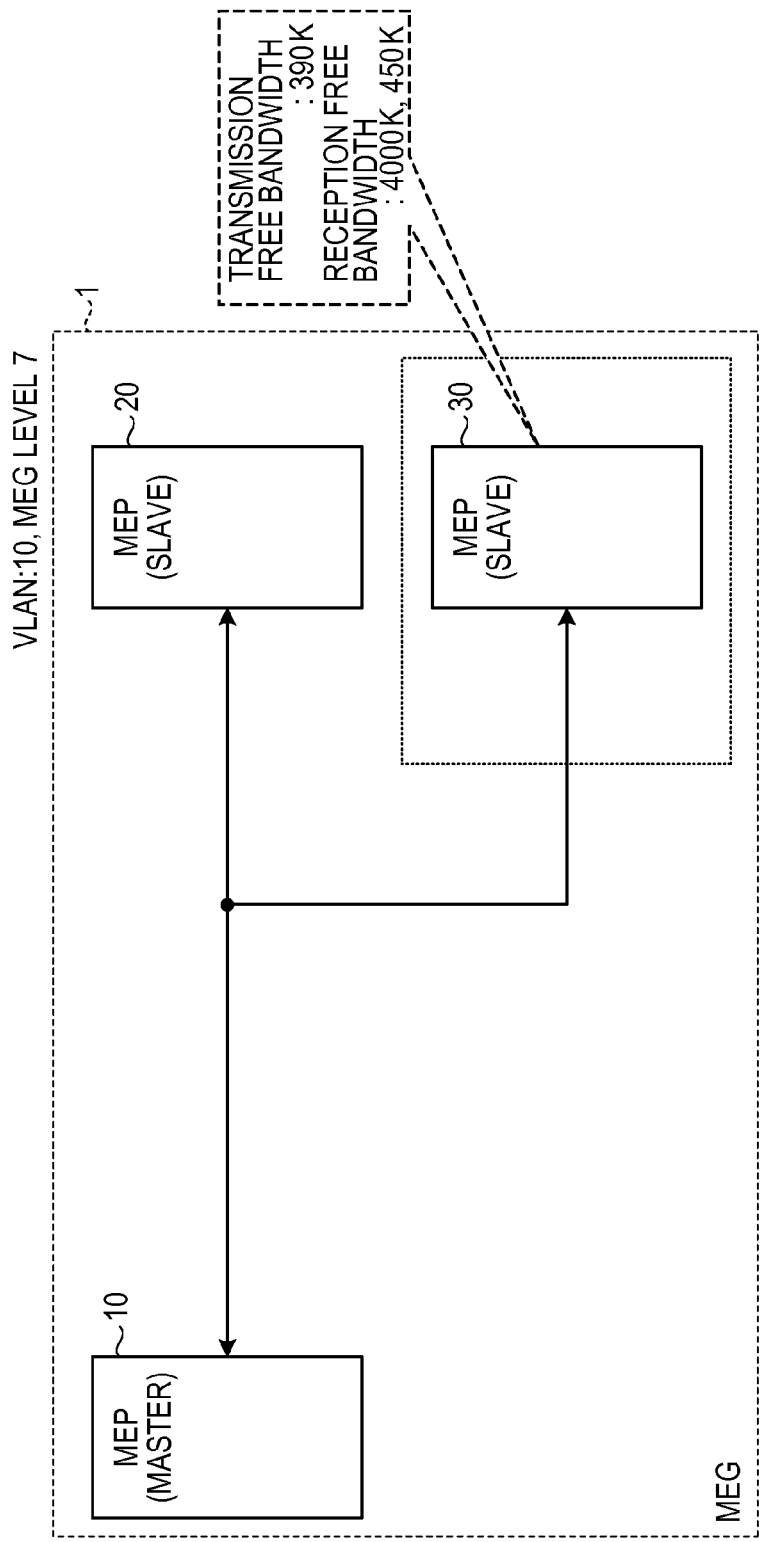
FIG. 25 is a schematic diagram illustrating an example of a process for calculating a free bandwidth for maintenance, according to an embodiment.

FIG. 25 is a schematic diagram illustrating an example of a process for calculating an OAM available bandwidth (a free bandwidth for maintenance) performed by the MEP 30. The MEP 30 uses the transmission free bandwidth of 390 Kbps calculated by the MEP 30 and the reception free bandwidths of 4000 Kbps and 450 Kbps obtained from the MEPs 10 and 20. The MEP 30 divides the reception free bandwidths obtained from the MEPs 10 and 20 by the number of opposite MEPs when calculating the OAM available bandwidth. This is because the reception free bandwidth of the MEP 10 is used not only by the opposite MEP 30 but also by the other opposite MEPs (the MEP 20 in this embodiment). Similarly, this is because the reception free bandwidth of the MEP 20 is used not only by the opposite MEP 30 but also by the other opposite MEPs (the MEP 10 in this embodiment). In FIG. 25, since the three MEPs 10, 20, and 30 are installed in the single MEG, the number of opposite MEPs relative to each of the MEPs 10, 20, and 30 is two, and therefore, the reception free bandwidths are divided by "2". Consequently, 2000 (=4000/2) Kbps is obtained as a reception free bandwidth of the MEP 10, and 225 (=450/2) Kbps is obtained as a reception free bandwidth of the MEP 20.

The MEP 30 obtains three free bandwidth values (390 Kbps, 2000 Kbps, and 225 Kbps) in accordance with the calculation process, and selects the smallest values among the free bandwidth values as the OAM available bandwidth (a free bandwidth for maintenance) for transmission and reception of CCM packets with the MEPs 10 and 20. In this embodiment, "225 Kbps" which is the smallest value is selected as the OAM available bandwidth. As described above, the MEP 30 may calculate a realistic bandwidth for packets for maintenance and monitoring taking communication capability of packets for maintenance and monitoring into consideration with reference to information including a transmission free bandwidth of an interface provided for the own maintenance and monitoring point and reception free bandwidths of interfaces provided for opposite maintenance and monitoring points.

Figure 26:
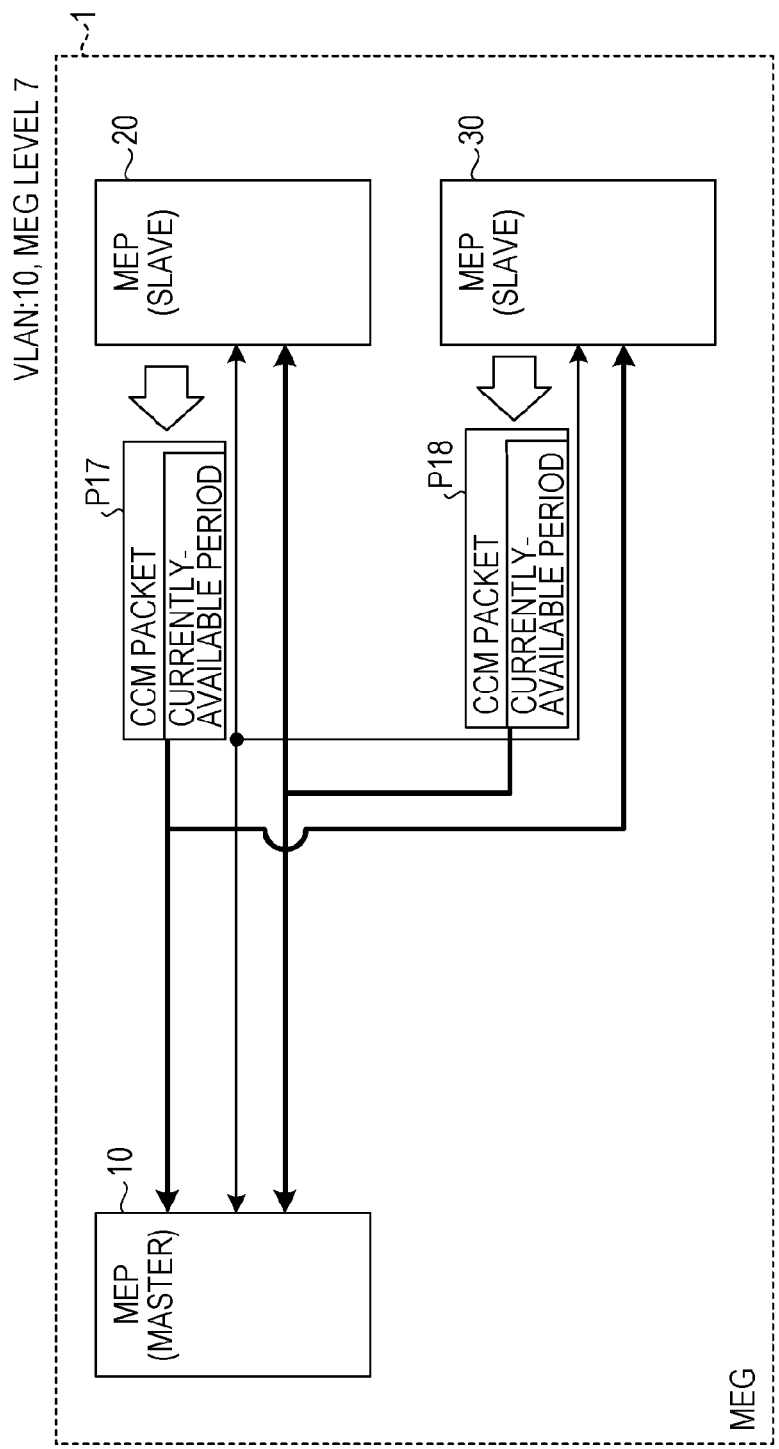
FIG. 26 is a schematic diagram illustrating an example of a process for calculating and notifying a currently-available period, according to an embodiment.

FIG. 26 is a schematic diagram illustrating an example of a process for calculating a currently-available period and notifying the other MEPs of the currently-available period performed by each of the MEP 20 and 30. The MEPs 20 and 30 obtain currently-available periods from the calculated OAM available bandwidths and current CPU usage rates of the own devices with reference to the user setting table 181b (refer to FIG. 5B). As illustrated in FIG. 26, the currently-available periods are stored in CCM packets P17 and P18 and transmitted to the master MEP 10 and the opposite slave MEP 20 or 30. For example, referring to the setting example of FIG. 5B, a current CPU usage rate of the MEP 30 of 70% is included in a CPU usage rate of 51 to 90% of an MEP[C1]. In the case of the CPU usage rate of 51 to 90% of the MEP[C1], when the OAM available bandwidth (a free bandwidth) is equal to or larger than 20 Kbps, the MEP 30 may cope with a period up to 100 ms. As described above, since the OAM available bandwidth of the MEP 30 is 225 Kbps which is equal to or larger than 20 Kbps, a currently-available period of the MEP 30 of "100 ms" is obtained. By a similar method, a currently-available period of the MEP 20 of "10 ms" is obtained. The results of the calculations are transmitted to the opposite MEPs using the CCM packets P17 and P18.

Figure 27:
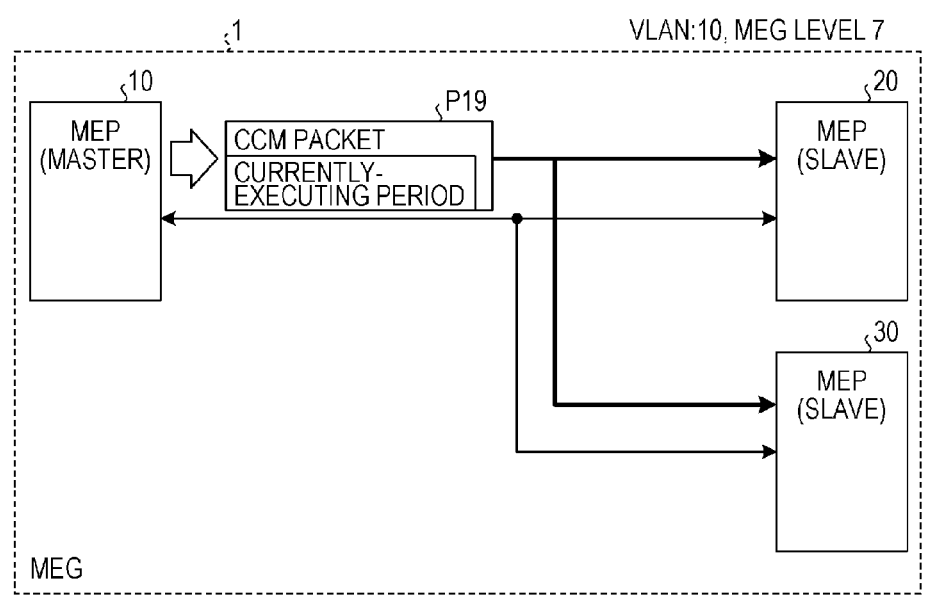
FIG. 27 is a schematic diagram illustrating an example of a process for determining and notifying a currently-executing period, according to an embodiment.

FIG. 27 is a schematic diagram illustrating an example of a process for determining a currently-executing period and notifying the slave MEPs 20 and 30 of the currently-executing period performed by the master MEP 10. The master MEP 10 obtains the shortest period from among periods which are executable in common by all the MEPs 10, 20, and 30 included in the MEG 1, based on the currently-available period calculated by the MEP 10 and the currently-available periods collected from the slave MEPs 20 and 30. The master MEP 10 determines the obtained shortest period as a currently-executing period. As illustrated in FIG. 27, the currently-executing period is stored in a CCM packet P19 and transmitted to the opposite slave MEPs 20 and 30. For example, in this embodiment, as described above, the currently-available periods of the MEPs 10, 20, and 30 are "10 ms", "10 ms", and "100 ms", respectively. Accordingly, the MEP 30 may employ the period of 100 ms but does not employ the period of 10 ms. The period of 100 ms which is executable in common by all the MEPs is determined as a currently-executing period.

FIG. 28 is a diagram illustrating an example of data stored in an opposite MEP table 184b after updating performed in accordance with a determination of a currently-executing period. A state of the opposite MEP table 184 of the master MEP 10 is changed from a state of the opposite MEP table 184a illustrated in FIG. 8 to a state of the opposite MEP table 184b illustrated in FIG. 28 when the currently-executing period is determined to "100 ms". Specifically, a setting value of a currently-executing period of an opposite MEP name "MEP[A1]" is speeded from "1 s" to "100 ms" (a shaded portion in FIG. 28).

Figure 29:
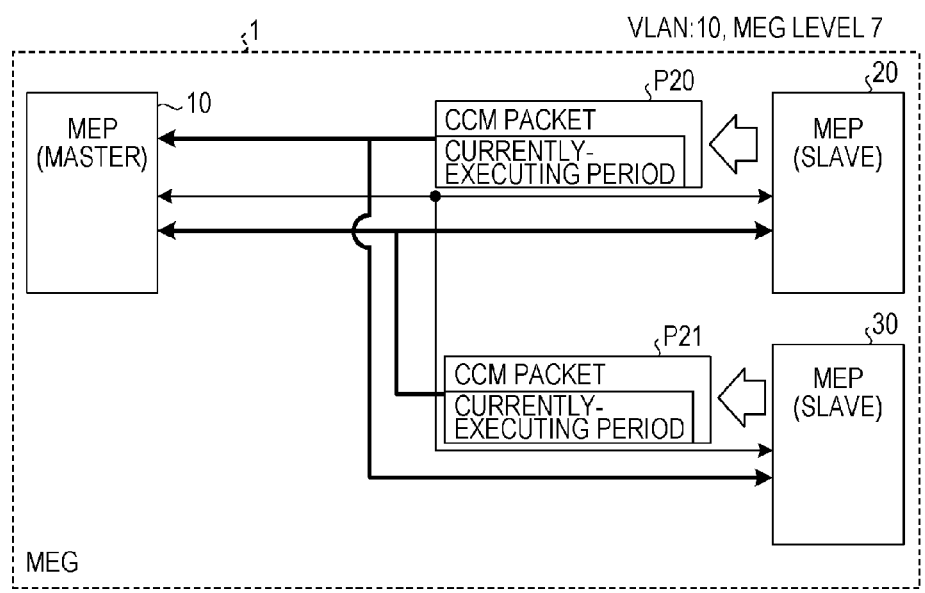
FIG. 29 is a schematic diagram illustrating an example of a process for receiving and updating a currently-executing period and responding to a master MEP, according to an embodiment.

FIG. 29 is a schematic diagram illustrating an example of a process for receiving and updating a currently-executing period and responding to the master MEP 10, performed by each of the slave MEPs 20 and 30. After receiving the currently-executing period determined by the master MEP 10, each of the MEPs 20 and 30 updates a currently-executing period included in a CCM packet which is to be periodically transmitted and transmits the CCM packet including the updated period to the master MEP 10 as illustrated in FIG. 29. By this, each of the MEPs 20 and 30 transmits a response to the notification representing the update of the currently-executing period. For example, in this embodiment, as described above, since the MEP 10 determines the currently-executing period of "100 ms", currently-executing periods included in CCM packets P20 and P21 transmitted from the slave MEPs 20 and 30, respectively, are also updated to "100 ms". Consequently, working periods of all the MEPs 10, 20, and 30 included in the MEG 1 become the same as one another.

FIG. 30 is a diagram illustrating an example of data stored in an opposite MEP table 184c after updating performed in accordance with the responses to notification of the currently-executing period. The master MEP 10 recognizes that the currently-executing periods of the slave MEPs 20 and 30 are updated to "100 ms", based on the responses by the CCM packets P20 and P21. In accordance with the responses, a state of the opposite MEP table 184 of the master MEP 10 is changed from the state of the opposite MEP table 184b illustrated in FIG. 28 to a state of the opposite MEP table 184c illustrated in FIG. 30. That is, values of the currently-executing periods corresponding to opposite MEP names "MEP[B1]" and "MEP[C1]" are speeded from "1 s" to "100 ms" (a shaded portion in FIG. 30). In addition, flags representing slave responses corresponding to the opposite MEP names "MEP[B1]" and "MEP[C1]" are changed to "1" representing that responses from the slave MEPs 20 and 30 have been received (a hatched portion in FIG. 30).

As described above, the MEP 10 performs transmission and reception of packets with the opposite MEPs 20 and 30. The MEP 10 at least includes the transmission/reception free bandwidth calculation unit 16, the period calculation unit 18, and the transmission module 112. The transmission/reception free bandwidth calculation unit 16 calculates a free bandwidth (an OAM available bandwidth, for example) available for transmission and reception of packets for maintenance (CCM packets, for example), within a bandwidth which is available for transmission and reception of the packets described above. The period calculation unit 18 determines a transmission interval of the packets for maintenance in accordance with the free bandwidth calculated by the transmission/reception free bandwidth calculation unit 16. The transmission module 112 periodically transmits the packets for maintenance to the opposite MEPs 20 and 30 at the transmission interval determined by the period calculation unit 18.

In the MEP 10, the transmission/reception free bandwidth calculation unit 16 may calculate the free bandwidth, based on the transmission free bandwidth of the MEP 10 and the reception free bandwidths of the other MEPs 20 and 30. This allows the MEP 10 to calculate a free bandwidth corresponding to an actual condition by taking a current state of a network environment which is changed from moment to moment into consideration, thereby realizing reliable control of a period. Furthermore, the MEP 10 further includes the CPU load calculation unit 110 which calculates a CPU usage rate of the MEP 10. The period calculation unit 18 may determine the transmission interval based on the free bandwidth and a processor usage rate (the CPU ratio, for example). This allows the MEP 10 to employ a more appropriate period as a currently-executing period by taking a machine specification and a load state which are unique to each device into consideration.

As mentioned above, the MEP 10 according to the embodiment is able to dynamically change and optimize a periodic transmission interval which has been fixed to a long period of time (10 minutes, for example) for ensuring a security margin irrespective of a free bandwidth for maintenance in the related art in accordance with a bandwidth available for maintenance and monitoring. This allows a period of time needed for detecting network failure to be reduced without reducing an actual traffic amount in accordance with reduction of a bandwidth available for data communication. In other words, specifying a free bandwidth by monitoring a bandwidth used for actual traffic allows the MEP 10 to recover from a failure in an earlier stage while suppressing adverse effect to network traffic (packet loss, increase of communication delay time, and the like).

For example, the MEP 10 first calculates a currently-available period based on reception free bandwidths of CCM packets received before the previous transmission of a packet, a transmission free bandwidth of the MEP 10, and preferable free bandwidths of individual periods. When the MEP 10 is a master MEP, the MEP 10 determines a currently-executing period based on the currently-available periods of the CCM packets received before the previous transmission of the packet and the currently-available period of the MEP 10. When the determined period is different from the currently-set period, the currently-executing period is updated. On the other hand, when the MEP 10 is a slave MEP, the MEP 10 checks a currently-executing period supplied from a master. When the supplied period is different from the currently-set period, the currently-executing period is updated. This allows the MP 10 to switch selection of period in such a manner that, when an actual network load is small, the MEP 10 selects a short period so as to give priority to maintenance and monitoring whereas when a actual network load is large, the MEP 10 selects a long period as before so as to give priority to actual traffic. This allows the MEP 10 to shorten a period of time needed for failure detection to a minimum extent within the range in which interference to actual traffic by OAM traffic for maintenance and monitoring is avoided.

Note that, in the foregoing embodiment, the master MEP 10 collects the currently-available periods from the MEPs 20 and 30. However, it is not necessarily the case that the master MEP 10 collects period values, and the master MEP 10 may collect the OAM available bandwidths and the current CPU usage rates described above which are calculated by slave MEPs 20 and 30. In this embodiment, the MEP 10 specifies the currently-available periods of the MEPs 20 and 30 using the OAM available bandwidths and the current CPU usage rates as parameters. Therefore, although a processing load of the master MEP 10 is increased, processing loads of the slave MEPs 20 and 30 are reduced, and accordingly, a period of time needed for the collection is reduced. Furthermore, each of the slave MEPs 20 and 30 is not requested to store a portion of data stored in the user setting table 181, and therefore, amount of used memory may be reduced.

Furthermore, in the foregoing embodiment, it is not necessarily the case that the components included in the MEP 10 are physically configured as illustrated. That is, embodiments of distribution and integration of the units are not limited to those illustrated in the drawings, and all or some of the units may be configured in a functionally distributed or integrated manner or in a physically distributed or integrated manner in an arbitrary unit in accordance with various loads and various usage situations. For example, a combination of the VLAN tag identification unit 12 and the EtherOAM identification unit 13, a combination of the EtherOAM protocol engine 14 and the period calculation unit 18, or a combination of the storage tables 181 to 185 may be integrated as a single component. On the other hand, the EtherOAM protocol engine 14 may be divided into a section which performs OAM packet transmission/reception management and a section which performs internal state management. Furthermore, the period calculation unit 18 may be divided into a section which determines a currently-available period and a section which determines a currently-executing period. Furthermore, a memory storing the tables 181 to 185 may be configured as external devices provided outside the MEP 10 where the memory and the MEP 10 are connected through a network or a cable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus controlling a transmission interval of maintenance packets in a communication network, the apparatus comprising:
   a memory;
   a processor coupled to the memory and the processor configured to:
      calculate, within a first bandwidth available for transmission and reception of packets, a second bandwidth that is free in the apparatus and usable for transmitting and receiving the maintenance packets for maintenance of the communication network;
      determine a transmission interval of maintenance packets in accordance with the second bandwidth calculated; and
   transmit the maintenance packets to another apparatus in the communication network at the transmission interval determined, and
   wherein the second bandwidth is calculated based on a third bandwidth that is free in the apparatus and usable for transmitting packets and a fourth bandwidth that is free in the another apparatus and usable for receiving packets.

2. An apparatus controlling a transmission interval of maintenance packets in a communication network, the apparatus comprising:
   a memory;
   a processor coupled to the memory and the processor configured to:
      calculate, within a first bandwidth available for transmission and reception of packets, a second bandwidth that is free in the apparatus and usable for transmitting and receiving the maintenance packets for maintenance of the communication network;
      determine a transmission interval of maintenance packets in accordance with the second bandwidth calculated; and
   transmit the maintenance packets to another apparatus in the communication network at the transmission interval determined, and
   wherein a usage rate of a processor of the apparatus is calculated, and
   the transmission interval is determined in accordance with the second bandwidth and the usage rate of the processor calculated.

3. A method controlling a transmission interval of maintenance packets in a communication network, the method comprising:
   calculating, within a first bandwidth available for transmission and reception of packets, a second bandwidth that is free in an apparatus and usable for transmitting and receiving the maintenance packets for maintenance of the communication network;
   determining a transmission interval of the maintenance packets in accordance with the calculated second bandwidth; and
   transmitting the maintenance packets to another apparatus in the communication network at the determined transmission interval, and
   wherein the second bandwidth is calculated based on a third bandwidth that is free in the apparatus and usable for transmitting packets and a fourth bandwidth that is free in the another apparatus and usable for receiving packets.

4. The method of claim 3, wherein the transmission interval of the maintenance packets is enabled to be adjusted subsequent to the determining.

5. The method of claim 3, wherein the transmission interval is adjusted to enable a period of time for failure detection within a range such as to avoid packet traffic interference by the transmitting of the maintenance packets.

6. The method of claim 3, wherein a process is executed by the apparatus to control the transmission interval of maintenance packets.

* * * * *